US006662310B2

(12) United States Patent
Lopez et al.

(10) Patent No.: US 6,662,310 B2
(45) Date of Patent: *Dec. 9, 2003

(54) METHODS FOR AUTOMATICALLY LOCATING URL-CONTAINING OR OTHER DATA-CONTAINING WINDOWS IN FROZEN BROWSER OR OTHER APPLICATION PROGRAM, SAVING CONTENTS, AND RELAUNCHING APPLICATION PROGRAM WITH LINK TO SAVED DATA

(75) Inventors: Marco Lopez, Beaverton, OR (US); Scott C. Elliott, Hillsboro, OR (US)

(73) Assignee: Symantec Corporation, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/438,135

(22) Filed: Nov. 10, 1999

(65) Prior Publication Data

US 2002/0152228 A1 Oct. 17, 2002

(51) Int. Cl.[7] .................................................. G06F 11/00
(52) U.S. Cl. ........................................... 714/15; 714/38
(58) Field of Search ............................. 714/15, 16, 20, 714/38; 707/507, 511

(56) References Cited

U.S. PATENT DOCUMENTS

| 4,514,846 A | 4/1985 | Federico ...................... 371/16 |
| 4,521,847 A | 6/1985 | Ziehm ......................... 364/184 |
| 4,580,232 A | 4/1986 | Dugan ........................ 364/523 |
| 4,589,090 A | 5/1986 | Downing ..................... 364/900 |
| 4,811,216 A | 3/1989 | Bishop ........................ 364/200 |
| 4,827,406 A | 5/1989 | Bischoff ...................... 364/200 |
| 4,870,644 A | 9/1989 | Sherry ........................ 371/16.1 |
| 5,008,853 A | * 4/1991 | Bly et al. ..................... 345/2.1 |
| 5,040,178 A | 8/1991 | Lindsay ...................... 371/21.5 |
| 5,124,989 A | 6/1992 | Padawer ...................... 371/19 |
| 5,276,860 A | 1/1994 | Fortier ........................ 395/575 |

(List continued on next page.)

OTHER PUBLICATIONS

U.S. patent application Ser. No. 09/438.020, Zeigler, filed Nov. 10, 1999.
U.S. patent application Ser. No. 09/438.076, Elliott, filed Nov. 10, 1999.

(List continued on next page.)

*Primary Examiner*—Robert Beausoliel
*Assistant Examiner*—Bryce P. Bonzo
(74) *Attorney, Agent, or Firm*—Fliesler Dubb Meyer & Lovejoy LLP

(57) ABSTRACT

A machine-automated system tries to save vital-data of a crashed or otherwise frozen application program by: (a) identifying the apparently-frozen program; (b) identifying one or more windows within the identified program that are most likely to immediately contain data which the user is likely to consider as vital and in need of saving; and (c) instructing the frozen application program to itself transfer the data of said one or more of said identified windows to a separate, data-saving thread. A profiling database may be constructed for helping to identify the vital data-containing windows of both popular (well known) and obscure application programs. One such profiling database has ID records which define parent/child hierarchy relationships between vital data-containing windows and other windows of various application programs.

9 Claims, 9 Drawing Sheets

U.S. PATENT DOCUMENTS

| | | | |
|---|---|---|---|
| 5,287,501 A | 2/1994 | Lomet | 395/600 |
| 5,293,612 A | 3/1994 | Shingai | 395/425 |
| 5,321,824 A | 6/1994 | Burke | 395/425 |
| 5,335,344 A | 8/1994 | Hastings | 395/575 |
| 5,410,685 A | 4/1995 | Banda | 395/575 |
| 5,493,649 A | 2/1996 | Slivka | 395/185.01 |
| 5,515,493 A | 5/1996 | Boston | 395/157 |
| 5,526,485 A | 6/1996 | Brodsky | 395/183.14 |
| 5,530,864 A | 6/1996 | Matheny | 395/700 |
| 5,559,980 A | 9/1996 | Connors | 395/427 |
| 5,561,786 A | 10/1996 | Morse | 395/497.01 |
| 5,568,635 A | 10/1996 | Yamaguchi | 395/497.02 |
| 5,581,696 A | 12/1996 | Kolawa | 395/183.14 |
| 5,581,697 A | 12/1996 | Gramlich | 395/183.11 |
| 5,696,897 A * | 12/1997 | Dong | 713/2 |
| 5,701,484 A | 12/1997 | Artsy | 395/683 |
| 5,712,971 A | 1/1998 | Stanfill | 395/183.1 |
| 5,748,882 A | 5/1998 | Huang | 395/184.01 |
| 5,812,848 A | 9/1998 | Cohen | 395/685 |
| 5,815,702 A | 9/1998 | Kannan | 395/591 |
| 5,819,022 A | 10/1998 | Bandat | 395/182.14 |
| 5,857,204 A | 1/1999 | Lordi | 707/202 |
| 5,857,207 A | 1/1999 | Lo | 707/203 |
| 5,911,060 A * | 6/1999 | Elliott | 707/200 |
| 5,938,775 A | 8/1999 | Damani | 714/15 |
| 5,974,249 A | 10/1999 | Elliott | 395/500.48 |
| 6,009,258 A * | 12/1999 | Elliott | 703/22 |
| 6,009,414 A | 12/1999 | Hoshiya | 705/30 |
| 6,044,475 A | 3/2000 | Chung | 714/15 |
| 6,151,569 A * | 11/2000 | Elliott | 703/22 |
| 6,173,291 B1 | 1/2001 | Jenevein | 707/200 |
| 6,182,243 B1 * | 1/2001 | Berthe et al. | 714/38 |
| 6,269,478 B1 | 7/2001 | Lautenbach-Lampe | 717/4 |
| 6,299,478 B1 * | 10/2001 | Jones et al. | 439/571 |
| 6,330,528 B1 | 12/2001 | Huang | 703/22 |
| 6,389,556 B1 | 5/2002 | Qureshi | 714/15 |
| 6,405,325 B1 * | 6/2002 | Lin et al. | 707/200 |
| 6,438,709 B2 | 8/2002 | Poisner | 714/23 |
| 6,438,749 B1 | 8/2002 | Chamberlain | 717/174 |

OTHER PUBLICATIONS

"First Aid® 97 Deluxe, User Manual," CyberMedia, Inc., 1996, pp. i–viii, 1–123.

"Vertisoft Fix–It™ For Windows 95, User's Guide," Vertisoft Systems, Inc., Jun. 1996, pp. i–vii, 1–86.

"WINProbe 95™ User Guide," Quarterdeck Corp., 1996, pp. i–vi, 1–88.

Adaptec, Inc.; GoBack: Product Tour—viewing your drive as it was in the past; http://www.adaptec.com/products/tour/goback4.html; Nov. 16, 2000; pp. 1–12.

Adaptec, Inc.; GoBack Product Reviews; http://www.adaptec.com/products/overview/gobackreviews.html; Jul. 21, 2000; pp. 1–5.

Adaptec, Inc.; What GoBack Users are Saying; http://www.adaptec.com/adaptec/testimonials/goback.html; Jul. 21, 2000; pp. 1–3.

Adaptec, Inc.; GoBack Product Awards; http://www.adaptec.com/products/overview/gobackawards.html; Jul. 21, 2000; pp. 1–3.

Adaptec, Inc.; ReZOOM Multimedia Presentations; http://www.adaptec.com/products/tour/rezoom_mm.html; Jul. 21, 2000 p. 1.

Adaptec, Inc.; GoBack: The Power to Undo PC Problems—product overview; http://www.adaptec.com/products/overview/goback.html; Jul. 21, 2000; pp. 1–3.

Adaptec, Inc.; GoBack: The Power to Undo PC Problems—data sheet; http://www.adaptec.com/products/datasheets/goback.html; Jul. 21, 2000; pp. 1–3.

Adaptec, Inc.; GoBack: The Power to Undo PC Problems on Shared or Workgroup Computers—data sheet; http://www.adaptec.com/products/datasheets/gobackprofessional.html; Jul. 21, 2000; pp. 1–3.

Adaptec, Inc.; GoBack: Product Tour—introducing GoBack; http://www.adaptec.com/products/tour/goback.html; Oct. 16, 2000; pp. 1–2.

Adaptec, Inc.; GoBack: Product Tour—restoring the system, step 1; http://www.adaptec.com/products/tour/goback1a.html; Oct. 16, 2000; pp. 1–2.

Adaptec, Inc.; GoBack: Product Tour—restoring the system, step 2; http://www.adaptec.com/products/tour/goback1b.html; Oct. 16, 2000; pp. 1–3.

Adaptec, Inc.; GoBack: Product Tour—recovering an overwritten file, step 1; http://www.adaptec.com/products/tour/goback2a.html; Oct. 16, 2000; pp. 1–2.

Adaptec, Inc.; GoBack: Product Tour—recovering an overwritten file, step 2; http://www.adaptec.com/products/tour/goback2b.html; Oct. 16, 2000; pp. 1–2.

Adaptec, Inc.; GoBack: Product Tour—recovering a deleted file; http://www.adaptec.com/products/tour/goback3.html; Oct. 16, 2000; p. 1.

Adaptec, Inc.; ReZOOM: Technology Comparison; http://www.adaptec.com/technology/overview/rezoom.html; Jul. 21, 2000; pp. 1–5.

Adaptec, Inc.; ReZOOM Compatibility Update; http://www.adaptec.com/support/compatibility/rezoom.html; Jul. 21, 2000; pp. 1–2.

Adaptec, Inc.; ReZOOM: Product Tour—Setup ReZOOM; http://www,adaptec.com/products/tour/rezoom1.html; Oct. 16, 2000; pp. 1–3.

Adaptec, Inc.; What resellers are saying about ReZOOM; http://www,adaptec.com/adaptec/testimoinals/rezoom.html; Jul. 21, 2000; pp. 1–2.

Adaptec, Inc.; ReZOOM: All–In–One Protection To Eliminate PC Downtime—product overview; http://www.adaptec.com/products/overview/rezoom.html; Jul. 21, 2000; pp. 1–3.

Adaptec, Inc.; ReZOOM: All–in–one Protection to Eliminate PC Downtime—ReZOOM Features; http://www.adaptec.com/products/overview/rezoomfeatures.html; Jul. 21, 2000; pp. 1–4.

Adaptec, Inc.; ReZOOM: All–in–One Protection To Eliminate PC Downtime—data sheet; http://www.adaptec.com/products/datasheets/rezoom.html; Jul. 21, 2000; pp. 1–4.

Adaptec, Inc.; ReZoom Product FAQs; http://www.adaptec.com/products/faqs/rezoom.html; Jul. 21, 2000; pp. 1–5.

Adaptec, Inc.; ReZOOM: Product Tour—Setup ReZOOM, cont.; http://www.adaptec.com/products/tour/rezoom1b.html; Oct. 16, 2000; pp. 1–3.

Adaptec, Inc.; ReZOOM: Product Tour—Testing Recovery; http://www.adaptec.com/products/tour/rezoom2.html; Oct. 16, 2000; pp. 1–2.

Adaptec, Inc.; ReZOOM: Product Tour—Using ReZOOM; http://www.adaptec.com/products/tour/rezoom3.html; Oct. 16, 2000; pp. 1–3.

Adaptec, Inc.; ReZOOM: Product Tour—ReZOOM Recovery; http://www.adaptec.com/products/tour/rezoom4.html; Oct. 16, 2000; pp 1–3.

Brown, L., et al., "Dynamic Snooping in a Fault Tolerant Distributed Shared Memory," IEEE, 1994, pp. 218–226.

Pietrek, M., "Windows™ 95 System Programming Secrets™," IDG Books Worldwide, Inc., 1995, pp. 692–694.

Richter, J., "Advanced Windows™, The Developer's Guide to the WIN 32® API for Windows NT™ 3.5 and Windows 95," Microsoft Press, Copyright 1995, pp. 809–838, 848–858.

Simpson, Alan, "Mastering WordPerfect 5.1 and 5.2 for Windows," SYBEX, 1993, pp. 407, 453–455.

Young, M.L., et al., "WordPerfect 6.1 for Windows for Dummies," IDG Books Worldwide, Inc., $2^{nd}$ Ed., 1994, pp. 335, 368.

* cited by examiner

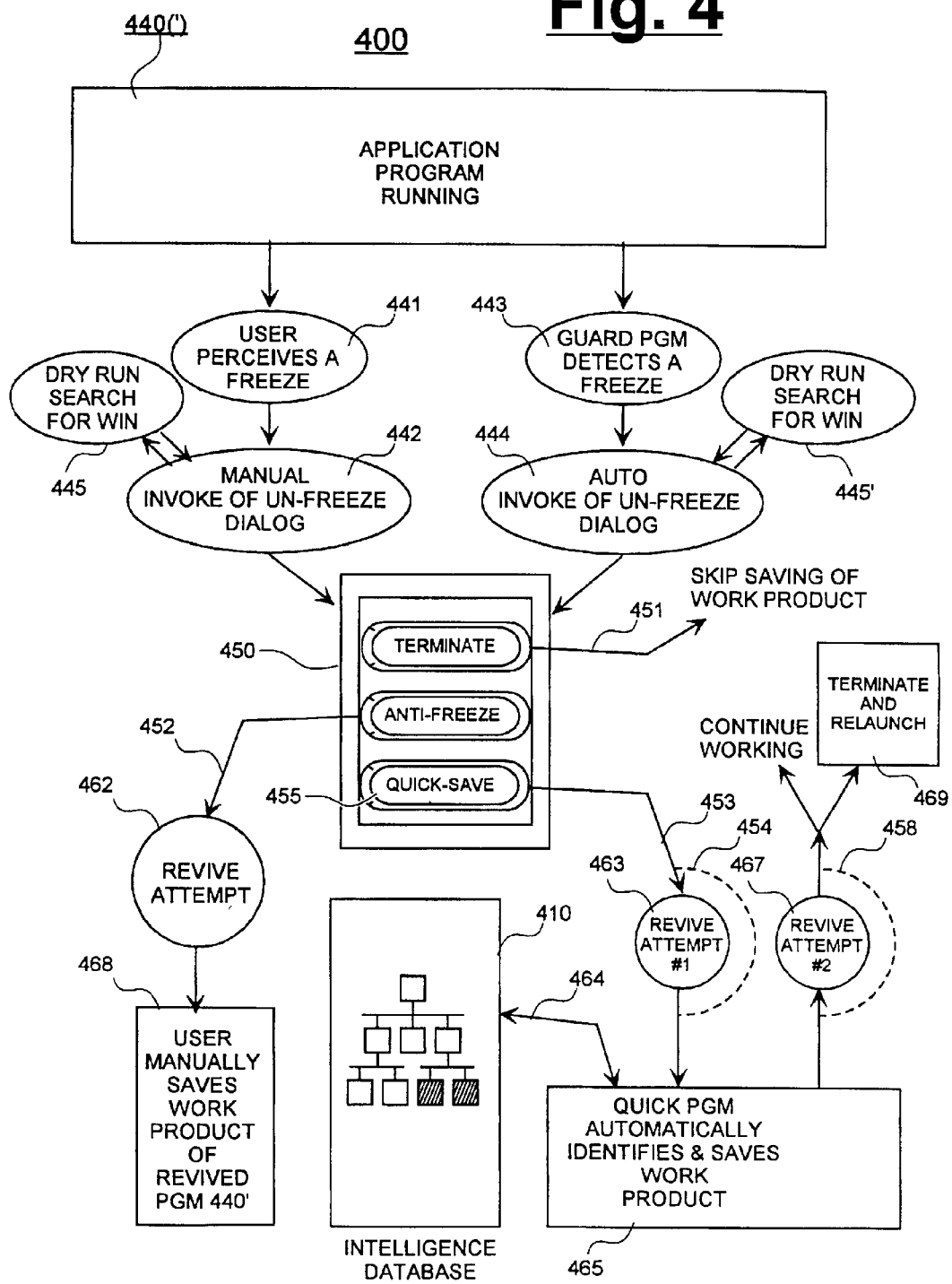

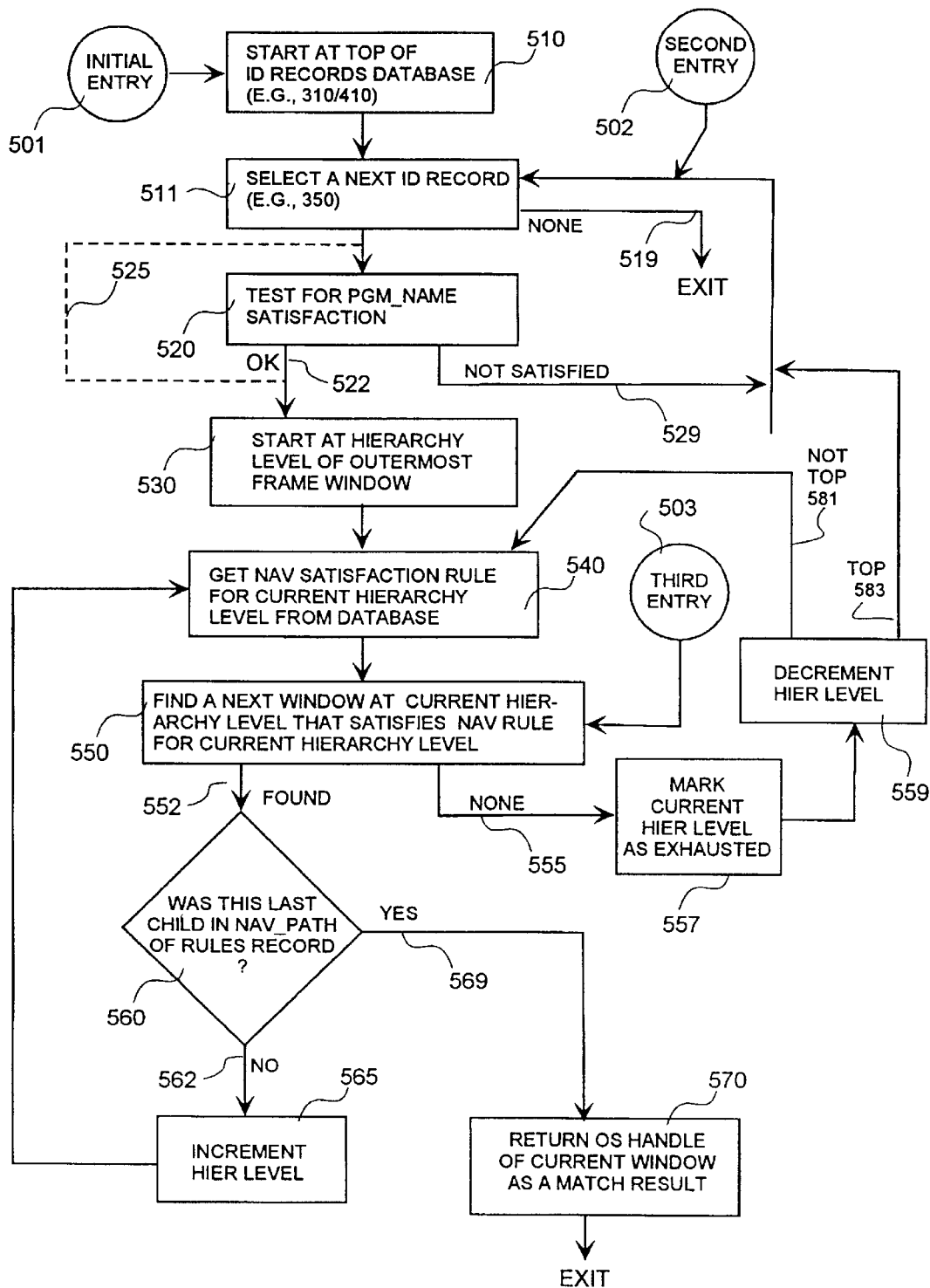

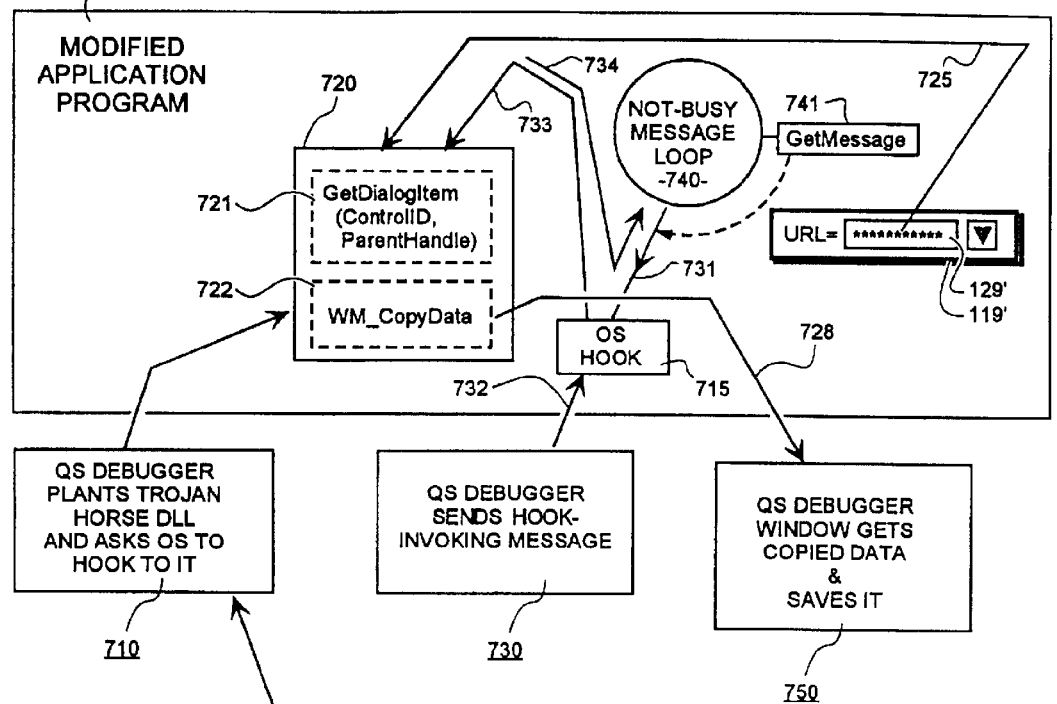
Fig. 7A
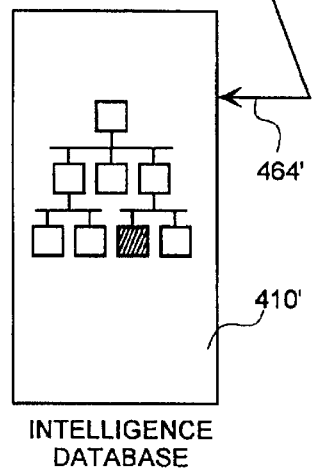
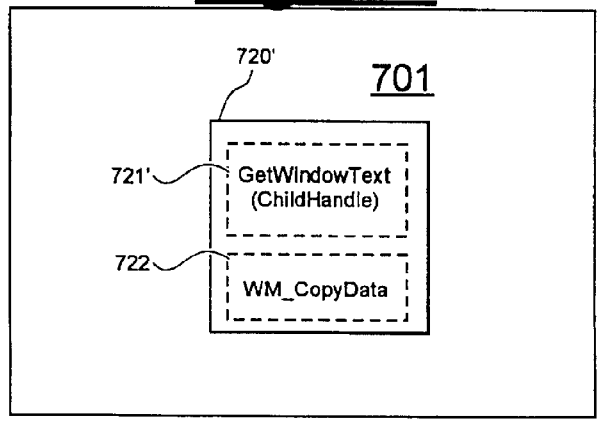
Fig. 7B

METHODS FOR AUTOMATICALLY LOCATING URL-CONTAINING OR OTHER DATA-CONTAINING WINDOWS IN FROZEN BROWSER OR OTHER APPLICATION PROGRAM, SAVING CONTENTS, AND RELAUNCHING APPLICATION PROGRAM WITH LINK TO SAVED DATA

This application was re-filed after May 29, 2000 and pursuant to 37 C.F.R. §1.53(d) to define a continued prosecution application (CPA) which continues from U.S. Ser. No. 09/438,135, filed Nov. 10, 1999.

BACKGROUND

1. Field of the Invention

The invention relates generally to computer systems that concurrently execute plural application programs on a preemptive multitasking basis.

The invention is directed more specifically to multitasking systems wherein the execution of a given application program, and more specifically a network-browsing program or the like, may become frozen or may otherwise halt unexpectedly and for which it is desirable to revive the frozen/halted application program at least to a state which enables nonvolatile saving of work product produced so far by the frozen program. The invention is directed even more specifically to the problem of how to appropriately locate and save work product items of a just-froze browser program or the like so that a fresh copy of the program can be relaunched and made to automatically re-link with the just-saved work product.

2a. Cross Reference to Related Patents

The disclosures of the following U.S. patents are incorporated herein by reference:
  (A) U.S. Pat. No. 5,911,060 issued Jun. 8, 1999 to Scott Elliott, and entitled, COMPUTER METHOD AND APPARATUS FOR UNFREEZING AN APPARENTLY FROZEN APPLICATION PROGRAM BEING EXECUTED UNDER CONTROL OF AN OPERATING SYSTEM; and
  (B) U.S. Pat. No. 5,974,249 issued Oct. 26, 1999 to Scott Elliott et al, and entitled, ZERO FOOTPRINT METHOD AND APPARATUS FOR EXPANDING ALLOCATED MEMORY SPACE OF A PROCESS USING A VIRTUAL MEMORY AREA.

2b. Cross Reference to Co-pending Patent Applications

The disclosures of the following Co-pending, U.S. patent applications (each owned by the owner of the present application) are incorporated herein by reference:
  (A) U.S. Ser. No. 08/938,204, filed Sep. 26, 1997, by inventor Scott Elliott, which application later issued as U.S. Pat. No. 6,009,258, entitled METHODS AND DEVICES FOR UNWINDING STACK OF FROZEN PROGRAM AND FOR RESTARTING THE PROGRAM FROM UNWOUND STATE;
  (B) U.S. Ser. No. 09/275,171, filed Mar. 24, 1999 as a divisional of U.S. Ser. No. 08/937,629, filed Sep. 26, 1997 by inventor Scott Elliott, which application later issued as U.S. Pat. No. 6,151,569, entitled AUTOMATED SEQUENCE OF MACHINE-PERFORMED ATTEMPTS TO UNFREEZE AN APPARENTLY FROZEN APPLICATION PROGRAM; and
  (C) U.S. Ser. No. 09/438,076, filed concurrently herewith by inventors Scott Elliott and Jeff Carr and originally entitled METHODS FOR AUTOMATICALLY LOCATING DATA-CONTAINING WINDOWS IN FROZEN APPLICATION PROGRAM AND SAVING CONTENTS.

2c. Copyright Notice

This application includes one or more listings of computer programs. The assignee of the present application claims certain copyrights in said computer program listings. The assignee has no objection, however, to the reproduction by others of these listings if such reproduction is for the sole purpose of studying it to understand the invention. The assignee reserves all other copyrights in said program listings including the right to reproduce the corresponding computer programs in machine executable form.

3. Description of Related Art

Multitasking computer systems may be characterized as those that allow multiple programs to execute in overlapping fashion so that it appears the programs are all running at the same time.

Preemptive multitasking systems may be characterized as those in which an operating system (OS) has supervisory control over the concurrently executing programs and the OS limits the length of time that each given application program has for using system resources such as a CPU (Central Processing Unit) or other data processing means.

Examples of preemptive multitasking OS's include Microsoft Windows95™, Microsoft Windows98™ and Microsoft Windows NT™, all of which are available from Microsoft Corporation of Redmond, Wash. These OS's also permit multi-threaded execution of programs. In multi-threaded execution, a program begins executing as a first, main thread and optionally generates ancillary threads that run concurrently and interact with one another through exchanges of semaphores.

During execution, a given application program, and more specifically a network-browsing program, may encounter an unexpected problem which halts its normal execution either in a main thread or an ancillary thread. Examples of causes for such problems include those in which: (a) the program attempts to access restricted (privileged) or unavailable areas of memory areas, (b) the program makes calls to unavailable system functions or services without the ability to handle such unavailability, (c) the program jumps into a nonsense stream of execution code, (d) the program invokes a no-time-out wait for an event that never happens, (e) the program enters into a deadlock embrace, and so forth. This is a nonexhaustive list of possible causes.

When such execution-halting events occur, artisans sometimes refer to the halted program as being 'stuck' or 'frozen' or 'crashed' or as having encountered a 'fatal error'. Different flavors of these terms are sometimes associated to one class of cause as opposed to another. Here, the terminology 'frozen application' will be generically applied to any and all situations in which the user of a given application program reasonably believes the program is stuck and that this perceived state prevents saving of work product irrespective of the exact cause and irrespective of whether the user's belief is accurate in fact. Also herein, the terminology 'recently-froze application' will be generically applied to any and all application programs which meet the definition of having become frozen at least once in the past and of not having been fully revived or launched afresh.

The end-user (e.g., novice user) of a computer system typically doesn't care what the specific cause is that has led him or her to believe that they can no longer save work product. Such a user instead generally recognizes the 'frozen' condition as an apparently sudden or recent refusal by the given application program to respond appropriately to keyboard strokes or to mouse clicks or to other user interface interactions (which interactions can include voice commands, hand gestures, and so forth).

The presence of a frozen program does not generally pose a major problem to the overall operations of a preemptive multitasking system. In such systems, other, concurrently-executing application programs can continue to run in normal fashion even though a given application (e.g., the network-browser) has actually become frozen or has actually crashed (as opposed to situations where the program is fine and the user merely believes it has become stuck). The end-user continues to have access to operating system services and to the resources of non-frozen application programs. (For example, in a Windows95/98™ environment the user may hit the Alt-Tab key combination to switch to the next task.) The user may choose to simply end the tasking of the apparently-frozen program and to thereafter restart the program afresh from its basic start-up state.

Sometimes, this close-and-restart-afresh option is not an attractive one for the end-user. It may be that the end-user did not, or believes he did not, save to nonvolatile memory (e.g., to hard disk), a segment of work product that he/she last generated with the application just before the given application became frozen. Closing-and-restarting the frozen program afresh may mean that the unsaved work may be lost forever or that the user will have to repeat many hours of work to thereby painfully reconstruct the state of the application program just before it apparently became frozen. In some instances, the pre-freeze state of the application may represent non-replicatable work product such as data that had just been captured and/or transformed in real-time.

To remedy this predicament, various un-freezing techniques have been developed. These try to revive the frozen/crashed program at least to a sufficient level such that unsaved work product may be accessed and saved either wholly or partially. Examples of such un-freezing techniques include those disclosed in the above-cited patents and patent applications.

Despite significant progress in the art of un-freezing programs that are apparently frozen, no currently known unfreezing technique is 100% effective for all possible forms of application program and all possible situations. One may make an analogy to attempts to revive a human patient by CPR (cardio-pulmonary resuscitation) after the patient suffers a cardiac arrest. In some cases, the patient is fully revived by a given CPR method. In other cases, the patient is revived but still suffers from serious complications. And in yet further cases, even heroic attempts to revive the patient with all known manners of CPR regretfully prove unsuccessful.

The above analogy to application of CPR on human beings breaks down fairly rapidly and should therefore not be taken to extremes. In so far as reviving a frozen application program is concerned, the end goal is not necessarily to keep the application program alive and happily working as long as possible, but rather to keep the machine-executed program alive long enough so that vital, but still unsaved, work product can be saved.

One un-freezing technique tests the apparently-frozen application to see if the cause of the freeze is a 'soft event' (where the application continues to respond to messages from the OS) or a 'hard event' (where the application is not longer responding to messages from the OS). If it is a 'soft event', the un-freezing technique may try to CLOSE or CANCEL the currently 'active' window under the theory that such an 'active' window is simply a hidden dialog box that is expecting a user response, but is not getting it because the user does not see the hidden dialog box.

If the cause of the freeze is determined to be a 'hard event', the un-freezing technique may try to continue the execution of the frozen application program by entering the execution stream of the frozen program at a point where continued execution will probably preserve the application's state just before the encounter with the freeze-causing event. However, even if this attempt is fully or partially successful, the long-term health of the defrozen application program may be questionable and it may be wise to save its work product and re-start the program afresh. Determining specifically what data within the just-froze (and possibly-revived) program should be saved and exactly how to go about saving it is still a problem.

Network-browsing programs tend to be particularly difficult to revive because many of their operations occur as background dispatches out of a 'periodic-peeking' style message loop. (The background dispatches can include continued resolving of HTML source code and continued decompression of GIF, JPEG or other graphic image code. The periodic peeks look for user-inputs such as clicks on screen buttons, in which case responding to the user-input (e.g., go BACK to previously visited site) takes precedence over continued servicing of the background dispatches.) Because of such factors, and generally speaking, when a network-browsing program freezes, there is a good likelihood that it will not be successfully returned into a fully operational state, and the user will have to terminate the program and re-launch it afresh.

Conventionally, after a revival technique is applied to a 'hard' failure event, a message is sent to the user to go ahead and try to immediately save their work product to nonvolatile memory and to then immediately shut down the application program. In some instances, the end user finds that these instructions are very easy to follow. The application program appears to be fully resuscitated and the end user may quickly forget that the program just suffered may have been a serious problem. The user may be able to easily maneuver the cursor to a SAVE BOOKMARK function on the program's menu bar and to invoke an address-saving operation that saves an address of a network site that the user had last navigated to. Sometimes the user may be so lucky as to be able to continue working as if nothing wrong had just happened, although such continuing of work defies the instructions given to the user.

In other cases, the end user's ability to follow the post-revival instructions turns out to be more complicated. The end user may find that mouse-driven functions of the program such as, SAVE FILE, or ADD BOOKMARK, or ADD TO FAVORITES, have become inoperative. The user may not know what else to do for saving navigation or other work product data. Also, the user may have multiple web sites open or multiple other work product objects (e.g., filled-in fields of a boiler-plate form document) left open and in need of saving. The user may become confused and try to use inoperative parts of the just-revived program instead of immediately saving all unsaved work product.

More specifically, if the frozen application program is an Internet browser program such as Microsoft Internet Explorer™, or Netscape Communicator™, or Netscape Navigator™ and the user has arduously navigated through many Web search results and/or through many hyperlinks to establish a current navigation history, then it can be quite disappointing to have the browser suddenly freeze up on the user. A novice user may simply panic and click on the application CLOSE button (the uppermost, right corner 'X' button) thereby terminating the frozen browser before any data is saved. A more experienced user may have the presence of mind to first copy onto a piece of paper, the current URL text (Universal Resource Locator) from the current address box before terminating so that he/she can at least navigate back to that last site. However, even such a more experienced user may make a transcription error and fail to properly log the full text of his/her current URL.

The present invention provides methods and systems which may be used as automated alternatives to leaving it to an end user to manually control the work product saving process in a just-froze browser or like application program. While the above example of a problem focused on the saving of a URL, the invention may extend to the saving of other forms of data as may be presented in multiple windows (e.g., edit-control windows). This broader aspect will be elucidated upon below.

SUMMARY OF THE INVENTION

A number of separate aspects of a multi-threading, windows-oriented operating system (OS) are employed here. These include: detection of a possible freeze and optional attempts at reviving an apparently-frozen program, analysis of the parent/child windows hierarchy in a just-froze program, and automatic passing of messages to appropriate child windows to cause the program of those windows to transfer their data contents to another program so that the data contents can be saved before the just-froze program is terminated or otherwise manipulated.

When an un-freeze request is presented, and a QuickSave or QuickReload™ option is selected (QuickReload™ is a trademark of Symantec Corp.), an appropriate revival procedure (which could include doing nothing) may be automatically selected and carried out. As part of the QuickSave or QuickReload™ operation, an automatic identification is made, in accordance with the invention, of one or more windows of the just-froze (and possibly-revived) program, where the identified windows are those that most probably contain (immediately in such identified windows), vital data that the user would most likely want to save for later use. In particular, the vital data of interest can be URL (Universal Resource Locator) text or other network address data that would allow the user to easily return to Internet Web sites or other network locations that have been visited without requiring the user to engage in a lengthy re-navigation through the network to find those sites again. Additionally or alternatively, the vital data of interest can be edit-control data such as may be found in the multiple-windows of an e-commerce fill-in form. For example, when a computer user begins to make a commercial transaction (or a like other transaction) over the Internet or another network, the transaction procedure may ask the user to fill-in or make choices within a lengthy form that asks for one or more of the user's first name, last name, postal address, email-address, home and business telephone numbers, shopping cart contents, and so on. The user's filled-in or chosen data is typically held as data within multiple and respective, edit-control windows, as will be detailed below. Such edit-control data can be identified and saved in accordance with the invention so that it may be re-represented to the user for filling in a post-crash, new form.

One of a number of alternate techniques (e.g., GetDialogItemText( ) and GetWindowText( )) may be used to cause the frozen (e.g., crashed) program (e.g., browser) to itself fetch and send the vital data (e.g., current URL or forms entry) to a debugger running in an independent thread so that the debugger can obtain and save the vital data before the frozen program is terminated or otherwise manipulated. Thereafter, even if revival attempts do not succeed, a fresh copy (a newborn copy) of the program that froze (or a substitute of like capabilities) may be automatically launched and the saved vital data (e.g., current URL) may be automatically sent to the newborn program for causing that newborn program (e.g., browser) to act upon that vital data. The end user is thereby given the impression that he or she is right back where they were just before the crash or other freeze occurred. Alternatively, a list of saved data may be presented (e.g., in a NotePad™ window) to the user for user-guided, and selective, copying and pasting of such data into appropriate edit-control or other windows in the newborn program.

A machine-implemented, quick-saving and reloading method in accordance with the invention can comprise one or more of the steps of: (a) optionally attempting to revive a program that has apparently become frozen and/or identifying that apparently-frozen program; (b) identifying one or more windows within the just-froze (and possibly-revived) program that are most likely to immediately contain therein data which the user is likely to consider as vital and in need of saving; (c) causing the just-froze (and possibly-revived) program (e.g., browser) to itself fetch and send the vital data (e.g., current URL, form entries) to a debugger running in an independent thread so that the debugger can save the vital data; (d) terminating the frozen program; (e) automatically launching a fresh copy (a newborn copy) of the program that froze or launching a substitute program (e.g., a browser from another vendor); and (f) transferring the saved vital data to the launched program.

Other features and aspects of the invention will become apparent from the below detailed description.

BRIEF DESCRIPTION OF THE DRAWINGS

The below detailed description makes reference to the accompanying drawings, in which:

FIG. 4 is a flow chart showing how a vital save activation fits in within a composite of other revival and save options;

FIG. 5 is flow chart showing details of a vital save operation in accordance with the invention;

FIGS. 7A–7C illustrate Trojan horse techniques that may be used in accordance with the invention.

DETAILED DESCRIPTION

Figure 1:
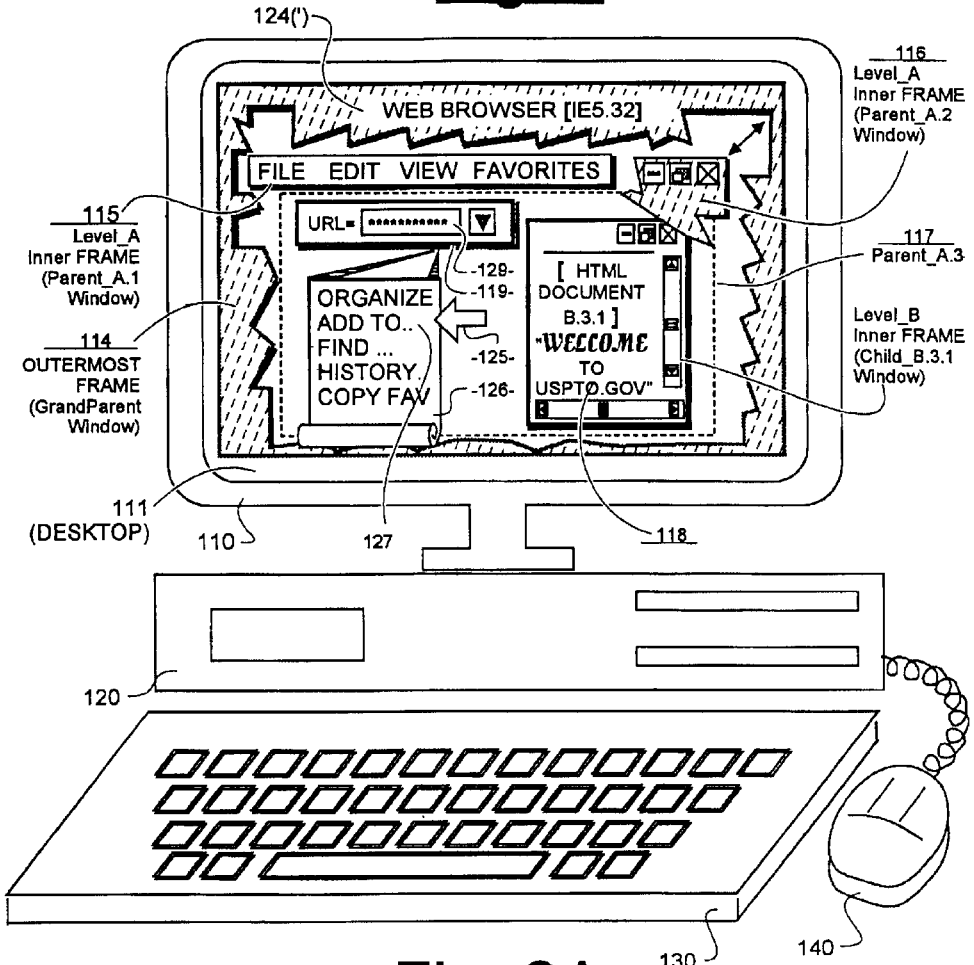
FIG. 1 is a perspective view showing a computer system that may be configured to operate in accordance with the invention.

FIG. 1 illustrates a perspective view of an overall computer system 100 that may be programmably configured to operate in accordance with the invention. This view will be used to explain a dilemma that can confront users when an in-use application program (e.g., a network browser) crashes or otherwise freezes before the user has had a chance to nonvolatily save work that is in progress.

The illustrated computer system includes a display monitor 110, a computer housing 120, a keyboard 130 and a mouse 140. The illustrated user input and output devices 110, 130 and 140 are merely examples. Other to-user output devices and from-user input devices may, of course, be used in addition to or in place of the illustrated devices. Mouse 140 for example can be replaced by or supplemented with other graphically-oriented user input devices such as trackballs, touch pads, joysticks, and so forth. Voice input and/or output interfaces are contemplated in addition to the illustrated visual and tactile interfaces.

Display monitor 110 includes a display screen 111 that can display a number of graphical items including a desktop layer and an overlying, opened application window 114. (Reference numbers that are braced by dashes or square brackets {-xx- or [yy]} are not part of what is displayed on the screen 111.) In the illustrated example, the opened application window 114 contains information belonging to a running, Internet browsing program 124, where the latter program 124 has the fictional name, WEB BROWSER. The actual web browsing program could be Microsoft Internet Explorer™, or Netscape Communicator™, or any one of a host of other commercially available, or proprietary, network browsing or like programs. In the more concrete example given below, the program 124 will be assumed to be Microsoft Internet Explorer™, version 5.x. The application window 114 could alternatively have contained an electronic mailing program (e.g., Qualcomm Eudora™) with network-navigating functions and/or edit-control windows, a spreadsheet program (e.g., Microsoft EXCEL™) with network-navigating functions and/or edit-control windows, a picture-drawing program (e.g., Adobe Illustrator™) with like network-navigating functions and/or edit-control windows, or any other such application program. The example of a network browsing program is used here because many computer users are at least familiar with this type of application program and the problems that may be encountered when such a program crashes or otherwise freezes up.

Application window 114 normally appears as being continuously filled with other items such as vertical and horizontal scroll bars, tool bars (not all shown), and a top menu bar 115. The top or main menu bar will typically have menu-dropping areas such as FILE, EDIT, VIEW, FAVORITES, etc. This is common for example in programs running under Microsoft Windows98™ or Microsoft NT™. The display of window 114 will normally not have the appearance of separated puzzle pieces such as is shown in FIG. 1. However, in truth the contents of what appears to be a unitary application program window such 114 are usually a cleverly integrated set of puzzle pieces, where the puzzle pieces are formed from other windows, and windows within those windows and so forth, all of these separate puzzle pieces being neatly tiled together to define a composite display object. The end user may not be aware that many parts of what appears to be a smoothly integrated main application window 114, are instead seen by the OS as a collection of separate windows. There may even be some windows that hidden behind other windows and therefore not visible to the user until such hidden windows are caused to pop up.

For purpose of reference, the outermost window frame in FIG. 1 is referred to herein as the grandparent window 114. Immediate and hierarchical children of this outermost, 'grandparent' window frame 114 are referred to herein as Level__A inner frames or more simply as Level__A 'parent' windows. Immediate children of the Level__A inner frames are referred to herein as Level__B inner frames or more simply as Level__B child windows. Each Level__B window may have its own, Level__C children and so forth. A tree-like organizational chart (see FIG. 2B) may be drawn to show which window is a child of which other window. Such a chart is known in the art as a windows hierarchy chart.

By way of a more concrete example, consider in FIG. 1, the topmost menu bar 115 in the application program window 114. This bar 115 will normally appear to a user as a seamless and integral part of outermost window 114. However, for purpose of this disclosure, bar 115 is shown for what, under usual circumstances, it really is to the operating system, namely, a Level__A child of grandparent window 114. Menu bar 115 is also referred to herein as a Parent__A.1 window so as to distinguish it from other Level__A children of grandparent window 114.

Consider next the combination of the main window's "minimize" button (symbolized as a minus sign in a square), its "shrink" button (shown as two overlapped rectangles in a square) and its "close" pushbutton (symbolized as an X in a square). These are illustrated in respective left to right order within puzzle piece 116. This puzzle piece 116 will normally appear to a user as a seamless and integral part of outermost window 114 that is placed in the upper right corner of frame 114. However, for purposes of this disclosure, the pushbuttons part 116 is shown for what it really is to the OS, namely, another Level__A child of grandparent window 114. Pushbuttons part 116 is also referred to herein as a Parent__A.2 window. Alternatively, each of the separate pushbuttons in puzzle piece 116 may be a separate Level__A child window. This explanation is just by way of illustration and does not limit the numerous ways in which parent and child windows may be interlaced to form a composite display object 114–119.

Consider next, a dashed rectangle 117 that is shown inside the confines of grandparent window 114. The borders of some windows may be invisible to the end user even though they are known to the operating system. Dashed rectangle 117 represents such an invisible-borders window that is a further Level__A child of grandparent window 114. This invisible-borders window 117 is also referred to herein as the Parent__A.3 window and also as a 'web page container' (for reasons that will be apparent shortly). Besides windows that have displayed areas which are visible to the end user, some programs (e.g., 124) can have hidden windows that are kept behind other windows and are thus completely invisible to the end user. (As an extension to this point, it may be noted that one of the more common problems that novice users encounter when they think their application program has 'crashed' is when an active window becomes hidden behind a passive window, and the hidden active window is waiting for a user input, such as a click on an 'OK' pushbutton. The application program would run just fine once the 'OK' pushbutton of the hidden dialog box is pressed. But the user does not see this 'soft' defect and therefore does not realize that it is simply the user's failure to respond 'OK' which is causing the program to appear as being nonresponsive.)

As explained above, Level__A windows may have children of their own. In the illustrated example, windows 118 and 119 are Level__B children of the Parent__A.3 window (117). Scroll bars, minimization pushbuttons and further such items within windows 118 and 119 may constitute Level__C children of the respective Level__B windows 118 and 119, and so on. However, it is not necessary here to go into too much detail about inner structures of windows 118 and 119 because, for now, we will be focusing instead on the general contents of the Level__B windows, 118 and 119. (Later below, we will focus more intently on a Level__C child of window 119, which child is referenced as 129 and constitutes an example of an edit-control window.)

In the illustrated example, we assume that child window 118 contains text (e.g., stylized "Welcome To USPTO.gov") that had been derived from an HTML source-coded document named HTML DOCUMENT_B.3.1 (source not shown). This fictitious document name is selected here to simplify the task of understanding that the text (e.g., "Welcome") of window 118 is derived from an unseen file named, DOCUMENT_B.3.1 and the derived (stylized) text is held within a first Level_B 'child' (window 118) of the third Level_A parent window 117.

When the browser is working properly, the user is normally able to see a user-movable cursor displayed on screen 111 in the form of an arrowhead or the like such as shown at 125. The cursor 125 is made movable over the other displayed items in response to user activation of the mouse 140 or of another such from-user signal input device.

More specifically, in one instance, cursor 125 has been moved over the FAVORITES part of main menu bar 115, and in response to a user depression of a mouse button, a drop-down menu 126 has unfurled from the main menu 115. The drop-down menu 126 includes a number of choosable, function items such as: ORGANIZE ( . . . the FAVORITES folder), ADD TO ( . . . the FAVORITES folder), FIND ( . . . in the FAVORITES folder), and so on where these functions are understood to relate in some way to a FAVORITES folder, the latter being a directory into which a user can nonvolatilely store navigation bookmarks, navigation shortcuts, files, and other such objects. For example, if the cursor 125 is dragged down to the choice item, ADD TO (referenced as 127), and then the depressed mouse button is released, the navigation path or URL of the network site that is currently being visited, will automatically be saved or bookmarked into the FAVORITES folder (where such a FAVORITES folder is not directly shown in FIG. 1). Thereafter, the user may search (e.g., 'FIND') or browse through the FAVORITES folder and activate the bookmarked site (e.g., by double-clicking thereon) in order to return to the site.

However, we will assume here that our exemplary web browsing program (124) has just suffered a crash or another type of freeze, this occurring just at the time that the user had manually navigated to the web site of DOCUMENT_B.3.1 (118) but had not yet saved the URL of that, now-being-visited, site.

We further assume that, after the freeze, the user allowed an unfreezing program such as Symantec CrashGuard™ (which is available from Symantec Corp. of Cupertino, Calif.) to attempt an unfreeze operation on the just-froze web browsing program 124. The attempted unfreeze operation of our example was able to partially revive the just-froze application program 124. The just-froze and partially-revived application program, now referenced as 124', is able to respond to some simple, test messages (e.g., "WM_NULL") sent to it from the OS. However, for unknown reasons, the just-revived application program 124' is not fully functional.

As a more concrete example of what such a partial nonfunctionality might entail, assume that the cursor arrowhead 125 that had previously appeared on screen now fails to show up inside window 114. A novice user may react in a panicked way after coming to believe that because the cursor arrowhead (125) is invisible, and even though the unfreeze operation had executed successfully, he or she cannot invoke the saving function, ADD TO ( . . . the FAVORITES folder), which function would normally be provided in GUI style from within drop-down menu 126 for allowing the user to immediately record the current URL into a nonvolatile part of machine memory.

A more advanced user may come to realize that the navigation path contents can still be saved by using an alternate method for invoking the drop-down menu 126, such as pressing on the Alt and *A* keys of the keyboard 130 (so as to activate the F*A*VORITES part of bar 115) and thereafter using the up/down cursor controls and the ENTER key to highlight the ADD TO item 127 and invoke it. (Note: the asterisks about the notation, *A* merely highlight it and are not part of the character strings shown.) Sometimes this alternate, through-the-keyboard method works. Sometimes it doesn't. That may depend on the extent to which the just-froze program 124' has been revived.

If the above assumed-scenario happens, the novice user may react in a panicked way after coming to believe that, even though the unfreeze operation had been run, he or she has lost access to all work product that has been developed since the last save of a navigation path to hard disk. Even a user of advanced skills may panic, particularly if the skilled user is not intimately familiar with the inner workings of the bookmark saving functions of the just-froze (and possibly-revived) program 124'. In the state of panic, the novice and/or advanced user may try to invoke operations that overly stress the just-froze (and possibly-revived) program 124' and cause it to crash or otherwise freeze again, thereby worsening the situation.

The advanced user may have the presence of mind to at least scribble onto a handy piece of paper the current URL (or other vital data). This data is generically shown in FIG. 1 as the multi-asterisk character string "**********" inside of a Level_C child 129 of Level_B window 119. However, the advanced user may make a transcription error and thereby may not fully or correctly jot down the navigation path to the web or network site that he/she had just been visiting. (And similarly if the vital data that should be saved is something else, the user may not fully or correctly jot down such another form of vital data). Even if the advanced user is successful, manual transcription and reloading is tedious and annoying. As such, better method is desirable.

The present inventors have found through experimentation that it is possible to automatically and with relative accuracy, locate and record, control-edit contents such as the navigation path (e.g., URL) that is stored in illustrated window 129. The identified and saved data provides a road map back to the web or other network site that the user had just been visiting. Such saving is premised on the assumption that the browser program 124(') has been keeping current the URL text (or other vital data) displayed inside window 129. The vital-data saving method can be advantageously effective if, relatively soon, or immediately after the program (e.g., 124) has apparently become frozen, one performs the following steps:

(1) identify those child windows (e.g., 129) of the apparently just-froze program 124' that immediately contain data (e.g., the URL text, "**********"), that is probably in need of saving;

(2) cause the just-froze (and possibly-revived) program to itself fetch content from the identified one or more child windows (e.g., 129) and to send their held text to a debugger that is running in a separate thread;

(3) cause the debugger to save the sent text (e.g., to a text file such as QUICK_SAVE.TXT) and to thereafter terminate the apparently just-froze program 124';

(4) launch a new network browser (or other application) that is either a fresh (newborn) copy of the browser (or other application) that just failed, or a substitutable other browser (or other application); and (5) automatically or manually pass the saved vital data to the launched, newborn or substitute browser (or other application).

While the above example of a lost URL seems trivial, consider now another problem that plagues Internet users.

Electronic commerce (e-commerce) is a rapidly growing form of transaction on the Internet. Typically, when a new customer (e.g., client computer) logs into an e-commerce site, a new-customer form (e.g., a new sales-slip, not shown) is displayed on the screen (111) with not just a single, control-edit window such as 129, and/or not just a single, control-combo window such as 119, but rather with large numbers of such user-editable regions that ask, by way of example, for the new-customer's first name, last name, postal address (including city, state, country and zip code), email-address, home and business telephone numbers, credit card number and expiration data, various items of demographic data, and shopping cart contents (or other transaction details), etc. Suppose that after filling in more than 50% of such an arduous form, the browser or another supporting program freezes or appears to freeze. The new-customer (client computer user) is left with the unpleasant impression that all the typing (and/or other work) he or she has performed until this point, in order to fill in the form, may be lost. Suppose, however, that after virtually pressing on a simple on-screen button (e.g., Quick-ReLoad™), the user sees the program as quickly re-loading and bringing back into appropriate data-entry boxes, all the information that has been entered into such form boxes (into edit-control windows) before the freeze took place. The user can then come to believe that no work product has been lost, and that he or she may pick up and continue exactly where they left off when the crash or other program-freezing event took place. As an alternative, imagine the program as quickly re-loading afresh and a data viewing and/or editing program also launching to reveal a document (e.g., QUICK_SAVE.TXT) that has stored in it, the vital-data from the earlier crashed or otherwise frozen program. The user can now copy and paste the earlier-entered data from the window of the data viewing and/or editing program into appropriate boxes of one or more windows in the re-loaded afresh program. How can this be done? More details will be given after we first describe a typical hardware and software configuration.

Figure 2A:
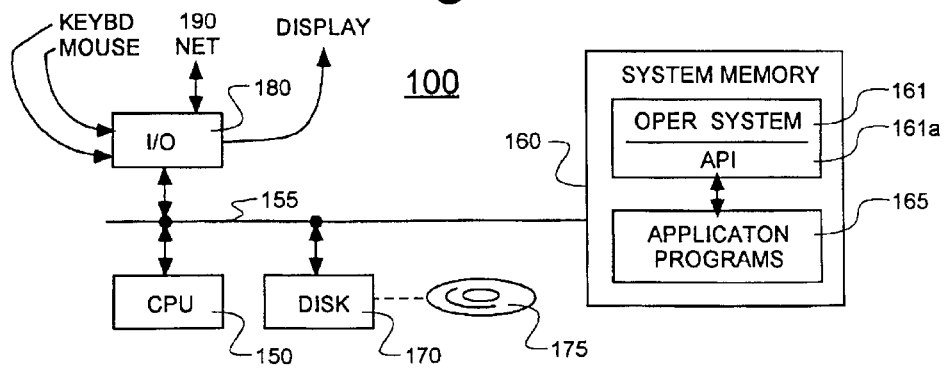
FIG. 2A is a block diagram of a computer system that may be configured to operate in accordance with the invention.

Referring now to FIG. 2A, a possible method for interconnecting components of computer 100 is shown schematically. Computer 100 may include a central processing unit (CPU) 150 or other data processing means (e.g., plural processors), and a system memory 160 for storing immediately-executable instructions and immediately-accessible data for the CPU 150 or other processors. System memory 160 typically takes the form of DRAM (dynamic random access memory) and cache SRAM (static random access memory). Other forms of such high-speed memory may also be used. A system bus 155 operatively interconnects the CPU 150 and system memory 160.

Computer system 100 may further include non-volatile mass storage means 170 such as a magnetic hard disk drive, a floppy drive, a CD-ROM drive, a re-writeable optical drive, or the like that is operatively coupled to the system bus 155 for transferring instructions and/or data over bus 155. Instructions for execution by the CPU 150 may be introduced into system 100 by way of computer-readable media 175 such as a floppy diskette or a CD-ROM optical platter or other like, instructing devices adapted for operatively coupling to, and providing instructions and data for the CPU 150 (or an equivalent instructable machine). The computer-readable media 175 may define a device for coupling to, and causing system 100 to perform operations in accordance with the present invention as further described herein.

System 100 may further include input/output (I/O) means 180 for providing interfacing between system bus 155 and peripheral devices such as display 110, keyboard 130 and mouse 140. The I/O means 180 may further provide interfacing to a communications network 190 such as an Ethernet network, a SCSI network, a telephone network, a cable system, or the like. Instructions for execution by the CPU 150 may be introduced into system 100 by way of data signals transferred over communications network 190. Communications network 190 may therefore define a means for coupling to, and causing system 100 to perform operations in accordance with the present invention. The instructing signals that are transferred through the communications network 190 for causing system 100 to perform said operations may also be manufactured in accordance with the present invention.

System memory 160 holds executing portions 161 of the operating system (OS) and of any then-executing parts of application programs 165. The application programs 165 generally communicate with the operating system by way of an API (application program interface) 161a. One of the operations that is routinely carried out, is the passing of object-oriented messages from one window object (not shown in FIG. 2A) to another such object within system memory 160. Often the OS 161 will act as an intermediate carrier of such messages. System memory 160 may include memory means for causing system 100 to perform various operations in accordance with the present invention as is further described herein.

With GUI-type operating systems (OS's) such as Microsoft Windows 3.1™ or Microsoft Windows95™, or Microsoft Windows N™ 4.0 the OS often temporarily stores data object specifications of executable or other software objects that are currently 'open' and immediately executable or otherwise accessible to the CPU 150. Although not specifically shown in FIG. 2A, parts of system memory 160 can be dynamically allocated for storing the data object specifications of open objects. The so-allocated memory space may be de-allocated when the corresponding object closes. The de-allocated memory space can then be overwritten with new information as demanded by system operations and actions of third party application programs. One of the data object specifications that the OS stores is a definition of which open window is a child of which open parent.

Figure 2B:
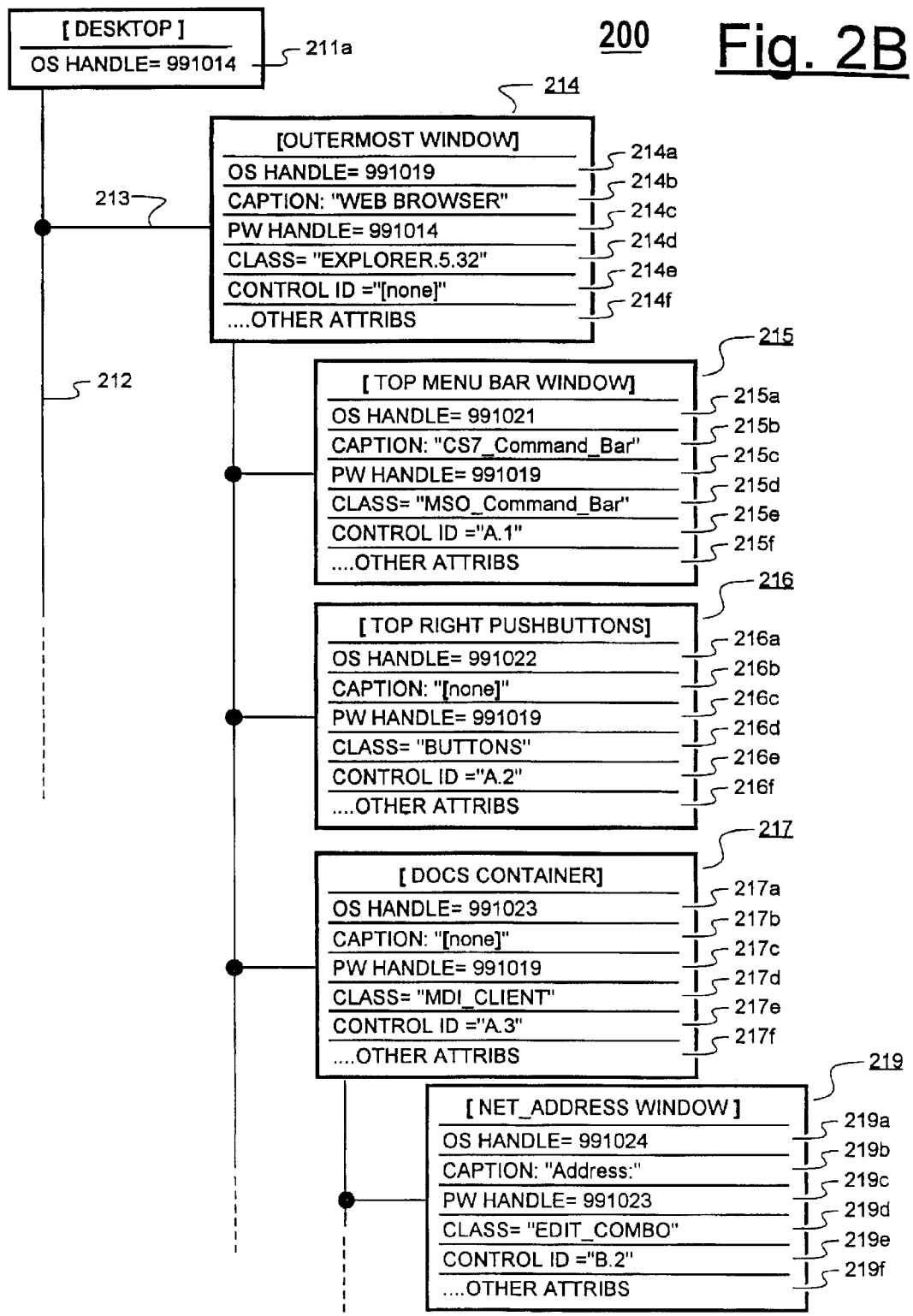
FIG. 2B is an example of a windows hierarchy chart.

FIG. 2B illustrates an example of a windows hierarchy chart 200 as such may be defined within a given computer (e.g., 100 of FIG. 1). Where practical, like reference numerals in the "200" century series are used for elements of FIG. 2B that correspond to elements referenced by "100" century series numbers in FIG. 1. Accordingly, element 211 corresponds to the desktop window 111 of FIG. 1. Element 214 corresponds to the outermost program window 114. Chart element 214 is understood to be a child of parent element 211 by virtue of the branch connection 213 which extends from trunk line 212. It is understood that many other branches (not shown) and correspondingly attached sub-trees may emanate from trunk line 212.

Similarly, chart elements 215, 216, 217 are understood to be hierarchical children of element 214 by virtue of the respective sub-trunk and branch connections which extends from element 214. Furthermore, chart element 219 is understood to be hierarchical child of container element 217 by virtue of the respective sub-trunk and branch connections which extends from element 217.

Referring by way of example to chart element 214 (the one representing the Web Browser outermost window 114), it is seen that each chart element can be identified by a variety of attributes, including, but generally not limited to: (a) an OS 'handle' 214*a* assigned to its corresponding window by the OS, (b) a window 'caption' field 214*b* which may be blank or filled and whose contents do not necessarily show in the actual window; (c) a parent window (PW) handle 214*c* which is the same as the OS handle of the corresponding parent and can thereby provide a back link to the parent window; (d) a 'class name' 214*d* which defines certain behavioral attributes of the window; (e) a 'control identifier' 214*e* that may optionally be assigned to the window by its parent so the parent can distinguish among its various children if there is more than one; and (f) further attributes such as 'style' bits which turn various aspects on or off and rectangle size/location fields which indicate the relative or absolute size and/or location of the corresponding window. It is to be understood that the OS can maintain a data structure within memory that conforms fully or partially to the hierarchy chart 200 shown in FIG. 2B.

In the Windows95/98™ environment, a Spy++™ program, which is available as part of Microsoft's standard programming tools, can be used to spy on a program's windows hierarchy and to display a windows hierarchy tree similar to what is shown in FIG. 2B.

Class names such as found in regions 214*d*, 215*d*, 216*d* and 219*d* of FIG. 2B can come in at least two flavors: generic and unique. A generic class name is one that is typically used by many different windows and does not therefore, uniquely distinguish one window from all others. Examples of generic class names include 'MDI_Client' (Multi-Document Interface Client) such as is shown at 217*d*. Other examples of commonly used, generic class names include: ScrollBar; Edit; Edit_Combo; MsoCommandBar (Microsoft Office menu bar); MsoCommandBarDock; WwB (Windows work block); and WwC (Windows work Container). Class names such as 'Menu BAR' and 'BUTTON' or 'BUTTONS' (216*d*) are further examples of names that may be deemed generic.

On the other hand, a unique class name such as the 'Explorer.5.32' of region 214*d* usually distinguishes a given window (e.g., 114) as belonging to a particular program (e.g., Microsoft Internet Explorer™ version 5.x for Win32 operating systems) and/or as being the outermost frame of that application program (124).

When a new window is created, the OS usually assigns a unique, window handle number to that window. The OS handle number (e.g., the one stored respectively in 214*a*–219*a*) may be used to uniquely address a given window. However, OS handle numbers are often assigned randomly during each run of the operating system, and as a consequence, one cannot be sure that a given OS handle will be used each time for a given window.

When a parent window (e.g., 114) has more than one immediate children, it may or may not wish to address those children (e.g., 115, 116, 117) individually, To this end, the parent window may assign, locally-unique, control ID's (e.g., A.1, A.2, A.3) to its respective child windows such as indicated in regions 215*e*–217*e*.

The windows hierarchy structure 200 of a given program may be scanned by manual or automatic means to determine which of its windows contains data that is worth saving in case of a freeze. For example the Highlight function of Microsoft's Spy++ program may be manually deployed to identify a correspondence between an on-screen window such as the URL-containerizing window 119 and the hierarchical chart element (e.g., 219) which defines its hierarchical position within the chart 200.

In general, different programs have respective and different windows hierarchy structures. It is up to the programmer to decide which windows should be children of what other windows, what sequence they are opened up in, and whether each given window is of a generic or unique class. A database may be constructed for each of multiple, commercial programs to identify where in the windows hierarchy of each, there will most likely be a window that contains information that the end user would generally consider vital and worthy of saving in the event of a freeze.

In the examples of FIGS. 1 and 2B, the immediate children of Parent A.3 (117, 217) will be the ones holding such 'vital' data that a user will most likely want to save, first and foremost, before saving other data that may be contained in other windows of the just-froze program 124'. More specifically, in order to accurately save the URL-representing, character string (e.g., "********") inside of the Level_C child 129 of Level_B window 119, it is desirable to first identify which specific window of an arbitrary, and frozen, web browsing program 124(') corresponds to the illustrated Level_C child 129 and thereby holds the URL-representing, character string. It has been found that this can be done by relying on an intelligent database such as one that will be described shortly with reference to FIG. 3**.

However, there is a special problem when running under preemptive multitasking and messaging OS's such as Microsoft Windows95™, Microsoft Windows98™ and Microsoft Windows NT™ with the task of obtaining the contents of a URL-holding window such as the illustrated Level_C child 129. The problem is that the URL-holding window 129 typically belongs to a class of windows known as 'edit control'. Such 'edit control' windows typically hold their text in an editable field and allow a user to change the contents of such a field with normal, text-editing functions. However, aside from holding a URL, the editable field of an arbitrary 'edit control' window might hold a security password or other such sensitive information. Because of this, preemptive multitasking OS's such as Microsoft Windows95™ try to block an outside window (or other type of program) from retrieving the contents of the editable field (e.g., the 'caption' field) of any arbitrary 'edit control' window. If a GetWindowText message or the like is sent via the OS, from a second window/program to an 'edit control' window, the OS returns an empty (null) string. As will be seen below, special procedures were developed for circumventing this feature of the OS.

It should be noted in passing that, in general, OS's such as Microsoft Windows95™ do *not* try to block an outside window (or other type of program) from retrieving the contents of a 'caption' field of an arbitrary other window, as long as the other window is not an 'edit control' window. This note is important because, below, the reader will see discussions concerning getting the captions from arbitrary windows that are not 'edit control' windows.

To summarize the discussion thus far, it is desirable, in accordance with the invention, to precisely identify the one or more windows of a just-froze application program (e.g., 124') that immediately contain vital data such as URL data and/or other edit-control entries, and to provide one or more mechanisms for retrieving data from such identified windows. For some off-the-shelf, commercial programs, the step of identifying the windows that immediately contain vital data is relatively simple because these files have a unique class name. However, for other application programs, the windows that immediately contain vital data have generic class names (e.g., Edit) and worse yet, the outer container windows (e.g., 117) that contain such vital-holding, inner windows also have a same or other generic class name (e.g., MDI_Client). This factor makes it difficult to automatically locate the correct windows of an arbitrary, just-froze program 124' that contains vital data.

Figure 3:
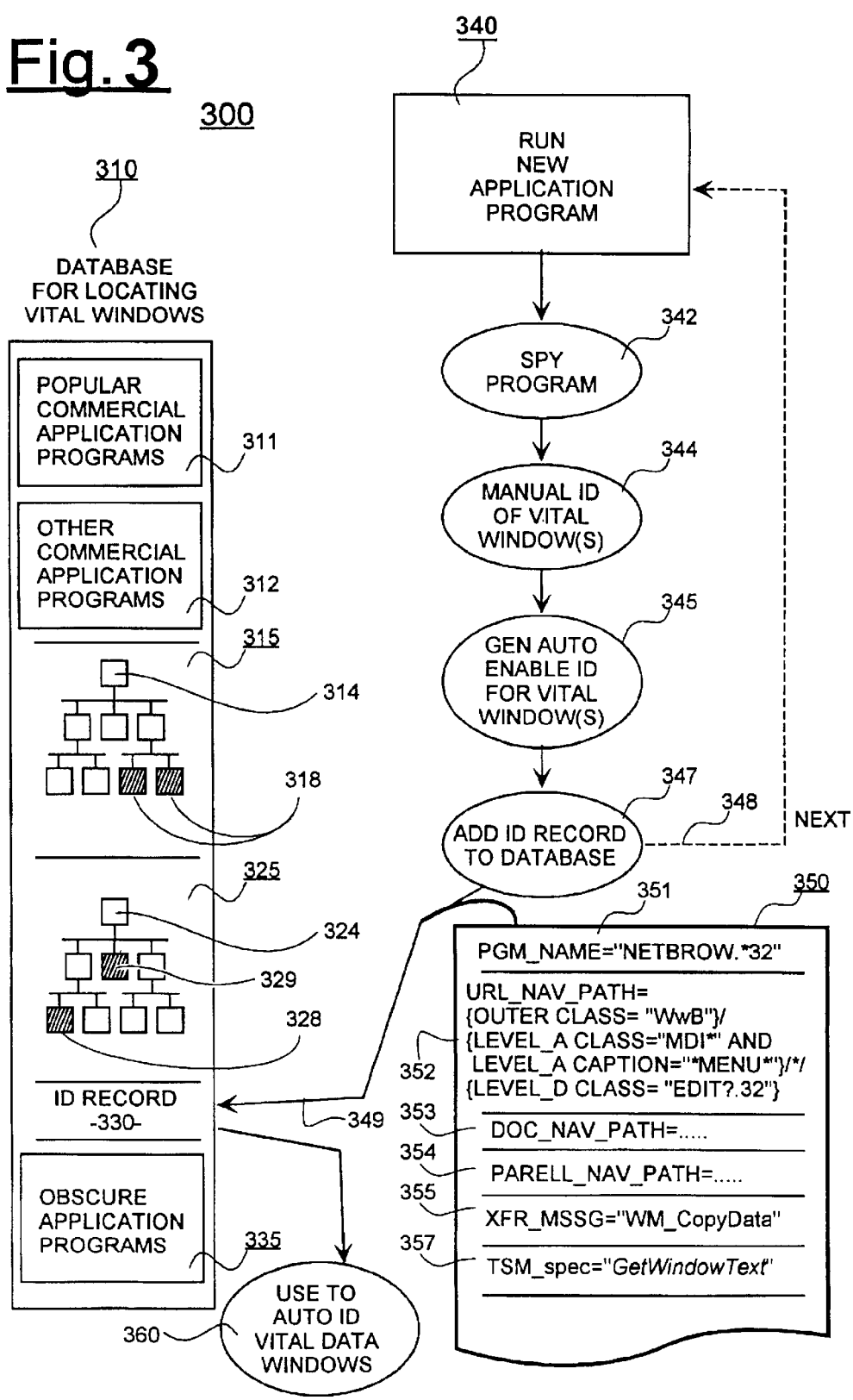
FIG. 3 illustrates a database building system in accordance with the invention.

FIG. 3 illustrates a system 300 in accordance with the invention for use in identifying the appropriate windows that contain vital data that a user most likely would want to have saved after an apparent freeze. A profiling database 310 is built up in accordance with the invention for helping to identify the vital data-containing windows of both popular (well known) and commercial application programs as well as for making intelligent guesses on which windows of obscure application programs are most likely to contain the vital data that the user would most likely want to have automatically saved after an apparent freeze. The database 310 may be formed as part of the general registry of the computer system or by other convenient means.

As seen, a first searchable part 311 of the database is dedicated to pre-existing and well-known commercial application programs such as various versions of Microsoft Internet Explorer™, Netscape Navigator™, and various versions of other popular network browsing and like programs. A second searchable part 312 of the database is dedicated to pre-existing, but less well-known, commercial application programs. A third searchable part 335 of the database is dedicated for adding on, navigation path definitions for locating the vital data-containing windows of afterwards created or later found, application programs.

The various parts of the database 310 are searchable by a machine-implemented search engine for finding a navigation path definition that either matches with both the program name of a just-froze program 1241 and also matches with a navigation-path to-an-existing-window found in the just-froze program 124'; or that correlates (statistics wise) with a navigation-path to-an-existing-window found in a just-froze program 124' (of unanticipated name) such that the found navigation path definition provides a rough best guess profile for the locating a vital data-containing window in the domain of the just-froze program 124'.

This can be explained better by considering an example of how a new record (ID RECORD) 330 for identifying vital data-containing window is added to the database 310. At step 340, a new application program is run (executed and exercised) for the purpose of defining one or more navigation paths to its vital data-containing windows. At step 342, a spying program such as Spy++™ is used by a skilled artisan for detecting the presence of different windows within the running program (340) and for tracing the parent/child hierarchies that form within the running program.

At step 344, dummy or actual vital data is generated through the use of the running program (340) and the spying program (342) is used to identify the location of a corresponding, vital data-containing window (e.g., 328) within the parent/child hierarchy chart (e.g., 325) of the running program (340). The spying program (342) is further used to identify attributes of the vital data-containing window (e.g., 328) and attributes of its parents or grandparents (e.g., 324) that will help to isolate or uniquely identify the vital data-containing window based on such attributes.

The window-related attributes that the inventors have found to be most useful in this endeavor, are first and foremost, the class (e.g., 214d) of each child or parent and secondly, the sequence in which such class assignments appear as one traces down the windows hierarchy chart (200) from outermost frame (214) to the window (e.g., 219) that immediately contains the vital data. Another attribute that may be used alone or in combination with window class for such ferreting out of the vital data-containing window, is the window caption attribute (214b). For some specific types of application programs (e.g., Internet browsers), the control ID (214e) that is assigned in a unique way to certain child windows may be useful for ferreting out such child windows and for coxing the child window to reveal its contents.

One or both of manual and automated methods may be used for generating a set of rules that will enable best-guess, automated identification of vital data-containing windows. Step 345 represents such methods for generating window-identification rules that will enable best-guess, automated identification of vital data-containing windows. The manual and/or automated methods of step 345 should establish rules which automatically exclude application windows that are least likely to contain vital data and which automatically include application windows that are more likely to contain vital data. Step 347 represents the adding of a new database record 349 to the database 310, where the added record 349 defines the window exclusion and/or inclusion rules. After the new ID record is added (349), step 348 may be followed for identifying a next, one or more windows that store vital data within the running application (340) or within a next-to-be categorized, application program.

A more specific example of window-identification rules is shown in boxed illustration 350. The boxed sets of rules (350) comprise four parts (351, 352, 353, 354) which may be read as follows: The identified window is likely to contain a sought-after kind of vital data IF the name of the just-froze application program (124') satisfies a first search query 351, namely, PGM_NAME="NETBROW.*32", where the asterisk (*) inside the search query represents a multi-character wild card (or more specifically, an arbitrary string of none, one or many characters), AND IF the navigation path to a URL-containing window is such that the outermost application frame on the desktop satisfies the second search query 352: OUTER_CLASS="WwB", AND the next successive hierarchy level parent (Level_A) satisfies the more complex search query: {LEVEL_A CLASS="MDI*" AND LEVEL_A CAPTION="*MENU*"}, AND windows of the next successive hierarchy level (Level_B) each satisfies the don't care condition: Attribute=*, AND the next successive hierarchy level, which is the targeted child window (e.g., Level_C) satisfies the search query: {LEVEL_C CLASS= "EDIT?.32"} where the question mark (?) is a single character wild card.

Alternatively, if the first search query 351 is satisfied AND a DOC_NAV_PATH query 353 is satisfied, then the last child satisfying the DOC_NAV_PATH query 353 is probably a document window containing document data in need of saving. (The search criteria in the DOC_NAV_PATH query 353 can be generally similar to those in query 352.)

Optionally and additionally, a non-vital window must be found that satisfies a parallel search query 354 (PARELL_NAV_PATH) before an either/or matching result from one of the URL_NAV_PATH query 352 and DOC_NAV_PATH query 353 is accepted as valid. If the URL_NAV_PATH query 352 is satisfied, its last child window is taken to be a URL-holding window. If the DOC_NAV_PATH query 353 is instead satisfied, its last child window is taken to be a document-holding window. If there are one or more other TYPE_NAV_PATH queries (not shown) where 'TYPE' can be replaced here with more descriptive identifiers such as, but not limited to: NON-URL_EDIT-CONTROL, CUSTOMER_FIRST_NAME, CUSTOMER_PHONE, etc, then satisfaction of such alternate queries may be taken to mean that the last respective child of a so-satisfied query is a window whose immediate data is associated with named 'TYPE'. See also the flow charts of FIGS. 4 and 5 which are described below.

The illustrated rules set 350 is of course, merely an example and therefore conveys the contemplation herein of many variations, including but not limited to: (a) not defining the program name (PGM_NAME) or allowing the PGM_NAME qualifier to be the multi-character wild card (*); (b) additionally or alternatively using further Boolean operators such as NOT and OR to respectively exclude and include various navigation sub-paths; (c) defining further vital-data holding paths besides those (352, 353) for a URL-containing window or a DOC-containing window; (d) defining further parallel-validating paths besides 354; and (e) using attributes other than CLASS and CAPTION for defining satisfaction conditions (e.g., CONTROL_ID= "B.2").

In general, the rule for satisfaction of the PGM_NAME query can be relaxed (made easier to satisfy, the ultimately relaxed rule being PGM_NAME="*") in counterbalance to a tightening of the URL/DOC/{other TYPE}/PARELL NAV_PATH rules and vice versa. In other words, if the PGM_NAME is very tightly-defined (e.g., PGM_NAME= "MS_EXPLORER.5.32.05"), then navigation path rules can be correspondingly loosened (e.g., DOC_NAV_PATH=*/MDI*/*). If the navigation path rules are very tightly-defined (e.g., URL_NAV_PATH="*/MDICLIENT/ EDIT.7.32"), then the PGM_NAME satisfaction rule can be loosened in comparison because it is unlikely that another application program would, by happenstance, satisfy such tight NAV_PATH rules.

In one embodiment, the rules records (such as ID record 330) are ordered alphabetically according to program name to simplify searching through them. In an alternate or complementary embodiment, the rules records (such as ID record 330) are ordered in accordance with likelihood of occurrence so that the records (311) of the more popular, commercial products are searched first for satisfaction and records (335) for obscure applications, including those whose names cannot be pre-anticipated are searched last. If the just-froze program 124' is such an obscure program whose name and/or windows hierarchy structure cannot be pre-anticipated, the hope is that the obscure program (335) conforms to a windows hierarchy and CLASS/CAPTION pattern of some other obscure or more popular (312) application program whose windows hierarchy and CLASS/ CAPTION pattern have already been captured in the database. It has been found, for example, that the general rule: PGM_NAME="*" and URL_NAV_PATH="*/EDIT-COMBO/EDIT*" is quite useful for correctly identifying the vital, editable-data-containing windows of many obscure application programs.

It is sometimes useful to specify a Transfer-request (XFR) message stream that is to be sent from the program (e.g., NETBROW) of a vital data-containing window to a data-saving debugger (e.g., CrashGuard4.0™) in order to help the debugger retrieve the data, as will be seen later, below. The illustrated XFR_MSSG field 355 of FIG. 3 may be used to store the Transfer-request message stream that is to be used in response to satisfaction of one or both of the PGM_ NAME and URL_NAV_PATH rules. In one embodiment, if field 355 is empty or not present, the default XFR message stream includes the Microsoft Windows messages, "WM_ CopyData".

It is sometimes useful to specify a specific TextSave-method (TSM) that is to be used to save vital-text from within a just-froze/possibly-revived program 124', as will be seen later, below. The illustrated TSM_spec field 357 of FIG. 3 may be used to store a specifier of the TextSave-that is to be used in response to satisfaction of one or both of the PGM_NAME and URL_NAV_PATH rules. In one embodiment, if field 357 is empty or not present, the default TextSave-method (TSM) is GetWindowText, however other OS API functions may be specified as having a better chance of success in a given situation, on a record-by-record basis.

The rules record that is represented in FIG. 3 at location 315 is shown in pictorial form to graphically demonstrate the idea that multiple windows at a given hierarchy level (e.g., Level_C) may satisfy a corresponding search query. Thus in illustrated record 315, the satisfying navigation path starts at outermost frame 314, excludes all the level_B windows, and finally isolates a subset, 318 of plural windows in level_C as being the best candidates for containing vital data. By contrast, the rules record that is graphically represented at 325 isolates both a level_B window 329 and a level_C window 328 as being the best candidates for containing vital data for its respective application program. Many other variations of this type will of course become apparent to those skilled in the art in view of the present disclosure.

Step 360 represents a machine-implemented process which uses the records 311–335 of database 310 to make intelligent identification guesses or choices as to which one or more windows of a recently-froze program (124') will most likely contain vital-data (e.g., URL or DOC data) and what the order of likelihood and data worthiness is for the plural windows of a given, just-froze program (124'), and which of plural, data-saving methods should be used. It may be desirable to try the save-vital-data operations according to a sequence which starts with most-likely and/or most-worthy candidates and trails off with least-likely and/or least-worthy candidates so that, if the just-froze program 124' experiences further crashes or other freezes during the save-vital-data operations, at least the more likely and/or more-worthy candidates will have had a better chance of being saved before the multi-crashing program dies for good (cannot have anymore of its vital data saved).

FIG. 4 provides a schematic diagram of a system 400 for so-utilizing a best-guess database 410 or the like. Application program 440 is one of plural, and preemptively multi-tasked programs running under an appropriate OS. At time point 441, the user detects a behavior or lack of behavior that cause the user to perceive program 440 as having recently become frozen. (This perception can be right or wrong as explained above.) At time point 442 and in response, the user invokes a defreezing subroutine that puts up dialog box 450. At the same time, and in the background, a dry run search 445 is conducted using database 410 to see if any of the URL_NAV_PATH and DOC_NAV_PATH queries (352 and 353) is satisfied by any window in the apparently-frozen program 440. If a URL_NAV_PATH query 352 is satisfied, third button 455 (in dialog box 450) is filled with the text, "QUICK SAVE" or "QUICK-RELOAD" or another message of like connotation that indicates the access path to the current net-browse page will be quickly saved so that it can be later, conveniently reloaded. If a DOC_NAV_PATH query 352 is satisfied, the third button 455 (in dialog box 450) is filled with the text, "DOC SAVE" or another message of like connotation (e.g., VITAL-SAVE™) that indicates that document data will be saved.

As an alternative to user-invoking path 441–442, at time point 443, an automated guard program (e.g., Symantec CrashGuard™) that had been running in the background, detects a behavior or a lack of behavior (e.g., not responding to messages) in application program 440. This causes the guard program to perceive program 440 as having become frozen or having encountered a fatal error. At time point 444 and in response to detection step 443, the guard program automatically invokes the defreezing subroutine that puts up dialog box 450 on the user's display. Before this, or at the same time, and in the background, a dry run search 445' is conducted using database 410 to see if any of the URL_NAV_PATH and DOC_NAV_PATH queries (352 and 353) is satisfied by any window in the apparently-frozen program 440. If a URL_NAV_PATH query 352 is satisfied, the third button 455 is filled with the QUICK SAVE" text or another message of like connotation. If a DOC_NAV_PATH query 352 is satisfied, the third button 455 is filled with the "DOC SAVE" text, or another message of like connotation (e.g., VITAL-SAVE™, {TYPE}-SAVE).

Besides button 455, dialog box 450 includes two further pushbuttons, respectively denoted as TERMINATE, and ANTI-FREEZE. (Other terms could be used.) If the user clicks on the TERMINATE pushbutton, then action path 451 is followed, and the corresponding application program 440 (including all its concurrent threads) is automatically terminated by the OS. If the user elects to click on the TERMINATE pushbutton, the user will be skipping the step of saving work product that has not yet been saved and will be risking the loss of such data.

If the user instead clicks on the ANTI-FREEZE pushbutton, then action path 452 is followed, and one or more revival techniques 462 are applied to the corresponding application program 440. (The revival techniques 462 can include those of the above-cited, U.S. Ser. No. 08/938, 204.) After the revival attempts 462 are carried out, full control is returned to the user. The user is then allowed to manually attempt to save his or her unsaved work product either manually (e.g., on a side piece of paper) or by trying to use various functions of the just-froze program 440'/124' or by other user-selected means. This option is indicated by box 468. In using the manual-save approach, the user is risking the possibility that some or all of the SAVE or ADD TO FAVORITES, etc., functions of the just-revived program 440'/124' may no longer be functioning either properly or at all. For example the FAVORITES drop down menu 126 of the outer window 114 may no longer be working. A novice user may not realize this and may nonetheless keep on trying to browse the network under the mistaken belief that the resuscitation efforts 462 have brought the just-froze program 440'/124' back to full health. Then in a panicked surprise, the novice user may later discover that the drop down menu 126 is no longer working. This can result in poor choices by the user of what to do next.

If the user had instead clicked on the QUICK-SAVE (or VITAL-SAVE™) pushbutton 455, then action path 453 would have been followed. One or more revival techniques 463 may then applied to the corresponding application program 440 to bring it into a state of partial viability. The revival attempts 463 may generally be the same as those applied in step 462. However, as explained above, it may be known ahead of time for certain programs that the revival attempts will be futile if they are of the 'hard' kind. The results of dry-run 4451 may be used to indicate what the likelihood of success is for various, initial, revival attempts such as shown at 463. If the chances of success are low, then bypass path 454 may be taken without performing the initial, revival attempts 463. In an alternate embodiment, bypass path 454 is always taken.

After the initial revival attempts 463 are carried out, with or without success; or the first bypass path 454 is taken, control is maintained by the machine and such control is passed on to a quick-save program 465. Intercepting actions may be taken by the quick-save program 465 to prevent the user from gaining control over the just-froze and possibly-revived program 440(') until after the quick-save program 465 has had an opportunity to automatically identify and save the contents of as many vital data-containing windows of the possibly-revived program 440(') as the quick-save program 465 can confidently identify. One of the ways in which the quick-save program 465 tries to prevent the user from gaining control, is by detecting dialog windows that are thrown up by the possibly-revived program 440(') (such as "Are you sure you want to close this document? Press ENTER or YES if true.") and by automatically selecting the correct option so as to allow window saving operations to complete unabated.

The automated process of identifying which windows in the possibly-revived program 440(') contain vital data, uses database 410 as indicated by connection 464. In one embodiment, database 410 of FIG. 4 is substantially the same as database 310 of FIG. 3. The quick-save process may include one or more of the following steps (1)–(10):

(1) Try to identify the name of the recently-froze and possibly-revived program 440('), and if identified, search the database 410 and try to locate within database 410, a rules record whose PGM_NAME satisfaction rule most tightly conforms with the identified, program name;

(2) If the PGM_NAME identification step (1) fails, search the database 410 and try to locate within database 410, a rules record whose NAV_PATH satisfaction rules most tightly conform with one or more to-window navigation paths found within the possibly-revived program 440(');

(3) If the NAV_PATH identification step (2) fails, search the database 410 and try to locate within database 410, a generalized or obscure rules record whose satisfaction rules conform in a relatively tight way with one or more of to-window navigation paths found within the possibly-revived program 440(') such that the located rules record (e.g., DOC_NAV_PATH="*/MDICLIENT/*") defines a general 'style' for windows found within the possibly-revived program 440(');

(4) If the URL_NAV_PATH=query is satisfied, add a DLL hook to the possibly-revived program 440(') or overwrite code into a portion of allocated memory in the possibly-revived (but not yet activated) program 440(') so that the DLL-hook or overwritten memory code can be invoked as a subroutine that fetches the URL-data (129) and passes it to a scratchpad memory area or the like for transfer to the revival debugger (which debugger may be part of revival and save programs 463 and 465). The DLL-hook or overwritten memory code is treated by the OS as an integral part of the possibly-revived program 440(') and thus the OS does not block such an integral part from fetching caption data out of a 'control edit' window (e.g., window 129). The DLL-hook or overwritten memory code is primed to run once the possibly-revived program 440(') is de-suspended. The hooked/re-coded program is now referenced as 440"/124".

(5) Use the debugger to de-suspend the just-froze and hooked/re-coded program 440"/124" so that the operating system begins giving task time to the revived program;

(6) Using the best guess provided by any one of steps (1)–(3), and as soon as possible after the de-suspend, send messages to the DLL hook or activate the new code so that the hooked/re-coded program 440"/124" fetches the URL-data (129) and transfers that fetched data to the debugger by, for example, sending a "WM__CopyData" message to a pre-defined window in the debugger.

(7) During the execution of each window-directed save operation, optionally monitor the windows environment of the desktop to see if the saving window (the one containing what is presumed to be vital data) puts up any dialog box or other message that needs to be responded to in order to keep the data-transfer process moving forward unabated. If such a process-abating dialog box or other message is detected, to the extent possible on an automatic basis, answer the dialog box or other message in a manner which will keep the data-transfer process moving forward unabated so that the debugger can receive the desired information and save it. Where such automatic response to the process-abating dialog box or other message is not possible, put up a dialog box instructing the user to pick the option that in the process-abating dialog box that is least likely to block the continued carrying out of the data-transfer process from the vital data-containing window;

(8) If during the execution of each data-transfer operation, a further freeze or crash occurs, automatically detect that condition and automatically attempt to again revive the re-frozen program so as to continue the carrying out of the data-transfer process for the corresponding, vital data-containing, window;

(9) Repeat steps (5)–(8) until there are no more vital data-containing windows left to transfer data out of;

(10) Wait for program status to switch to idle by, for example, using the WaitForInputIdle function of Windows95/98™, and thereafter record the name of, and shut down the main program by issuing to the main outer window (e.g., 114/214) of the program (440"/124") one or more command messages such as (in preferred order): WM__CLOSE and WM__QUIT. Even if the WM__CLOSE message does not work, the WM__QUIT message should at least force the program to quit its main message loop. Thereafter, if neither of these steps causes the program (440"/124") to shut down cleanly, use the TerminateProcess function of the OS to more forcibly terminate the frozen-and-afterwards-revived and de-suspended program (440"/124");

(11) Wait for the program termination to complete and thereafter, either automatically or after permission is manually granted by the user, relaunch a fresh (not corrupted) copy of either the frozen-and-afterwards-revived program, or an equivalent program (e.g., a browser from another vendor). Re-load into that fresh copy of the program, the data that had been saved by the process of steps (5)–(9); or alternatively display a side window from which the user can selectively copy and paste data into the fresh copy of, or substitute for, the program.

As seen in FIG. 4, all of the above steps do not have to be carried out in sequence. If the initial, revival attempts 463 fail or are bypassed (454), the quick-save program 465 may nonetheless try to identify and save vital data (e.g., the current URL of a crashed browser). Thereafter, secondary revival attempts 467 may be attempted or bypassed (458). Thereafter, if one or both of the initial and secondary revival attempts 463, 467 are successful, the user may elect to continue working (although this course of action is not recommended). Alternatively, after step 467 or 458, the crashed or otherwise frozen program is terminated in step 469, and a fresh copy of, or a suitable alternate for the frozen program is launched, and the data that was saved by the quick-save program 465 is automatically transferred to the launched substitute of step 469.

FIG. 5 provides a flow chart of a first identification process 500 for identifying those windows of a just-froze program 440'/124' that probably contain vital data (e.g., URL-data) that is worthy of saving. Initial entry is made at step 501.

At subsequent step 510, the method points to the top or other starting point of the ID records database 310/410.

At following step 511, the method selects a next ID record (e.g., 350) from within the database. If there is none, an exit is made by way of path 519 with an indication that no more records are available.

In one embodiment, step 520 follows while in an alternate embodiment, bypass path 525 is taken. In step 520, the machine-implemented method 500 tests for satisfaction of the PGM__NAME search criteria. Path 529 is taken back to step 511 if the PGM__NAME search criteria is not satisfied. Path 522 (OK) is taken to subsequent step 530 if the PGM__NAME search criteria is satisfied.

At following step 530, a level-tracking pointer starts by pointing to the parent/child hierarchy of the outermost window (114/214) of the just-froze program 124'.

At subsequent step 540, that portion of the current navigation path criteria rule (URL__NAV__PATH or DOC__NAV__PATH or PARELL__NAV__PATH) that applies to the current parent/child hierarchy level is fetched. Initially the level is that of the outermost window (114/214), but as will be seen in step 565, the current level can be incremented to deeper levels, such as Level__A child, Level__B child, Level__C child and so on.

At subsequent step 550, a current parent/child hierarchy level in the windows chart of the just-froze program 440'/124' is scanned to find a next window within that part of the chart whose attributes satisfy the fetched navigation path criteria rule (NAV__PATH) for that current level. If there is no, next such criteria-satisfying window, path 555 is followed to step 557, where current tree search tracking controls are updated to indicate this level has been exhausted for the current tree branch that is being investigated.

If instead, a next such criteria-satisfying window is found, path 552 is followed to test step 560. In test step 560, it is determined whether the matching child window corresponds to the last entry in the navigation path criteria rule (end of NAV__PATH). If the answer is YES (569), then the window that has just been found is deemed to be a good candidate for being a vital data-containing window or for being a validating parallel child (where latter applies if NAV__PATH is that of the PARELL type). At step 570, the OS handle (218a) of the matching window is output as an identification of such a good candidate. Of course, other means for uniquely identifying the good candidate window may be used alternatively. The result which exits out from step 570 may feed into a list-making routine which compiles a list of good candidates, where that list may be further sorted for distinguishing between candidates that are more likely or less likely to contain vital data. Alternatively, the result that flows out with the EXIT from step 570 may be immediately used for initiating a data fetch operation from the matching window of the just-froze program 440'/124'.

If the answer test step 560 is NO (562), then the window that has just been found is deemed to be merely a possible parent of a possible good candidate. The actual child window that is being sought is deeper into the search tree, and as such, step 565 increments the level tracking control to go to the next deeper level. If the current level had been the outermost frame (Level_0), then the next deeper level is Level_A. If the current level had been Level_A then the next deeper level is Level_B, and so forth. Control is thereafter given to step 540 and the loop continues until a matching window that meets the full criteria of the navigation path rule (from front to end of NAV_PATH) is found; or the search tree branch is exhausted and, as a result, the search should move on to a new branch.

As long as exploration of a given level is not exhausted, third entry point 503 may be used to repeatedly enter the loop defined by steps 550–560–540 and to search for more child windows that satisfy the full criteria of the navigation path rule. Once that section of the searchable tree is exhausted, the search recursively steps back up the tree to find the next unexplored branch by passing through step 559 (Decrement Hierarchy Level). If the top of the tree has not been reached, then control passes along path 581 back to step 540. On the other hand, if the top of the tree has been reached, path 583 returns control back to step 511 for the fetching of a next ID record. Alternatively, path 583 can be an exit step. The next-higher level of software can then selectively re-enter the illustrated loops by way of second entry point 502, which feeds into step 511.

A second method for performing identification of the a NAV_PATH-satisfying, child window is given by the below pseudo-coded function, "FindMatchingChild". The function, "FindMatchingChild", accepts two parameters: 1) a particular branch-starting window whose descendants are to be searched; and 2) a list of satisfaction rules that are to be satisfied by the matching descendants. It is assumed that a global or other such list of matches is being compiled for storing each of the successful matches. When the call to FindMatchingChild completes, a test may be run to see if it succeeded in finding a match by checking the size of the global/other list to see that it is either no longer empty or has grown.

The below pseudo-code for the FindMatchingChild function begins at a point that corresponds roughly to step 530 of FIG. 5. Some particular ID record has been selected and its rule list has been obtained.

The FindMatchingChild function can be employed in at least one of two ways: 1) by passing it the program's outermost window and a list of matching rules, or 2) by passing it the desktop window and requiring the first rule to find the program's outermost window (which window is a child of the desktop). These two methods should yield generally equivalent results. The second method provides a slightly greater amount of flexibility in that the name of the just-froze program (124') is not always identifiable by automatic means, but the just-froze program can be nonetheless identified as a child of the desktop (111) that has certain window attributes. The second approach also simplifies the process by integrating the step of finding the outermost grandparent window into the recursive procedure for searching for all the child document windows.

Using the rule list of the ID record 350 shown in FIG. 3, for example, the following parameters would be passed to FindMatchingChild: (a) the OS handle for the desktop window, and (b) the URL_NAV_PATH rules: {Class="WwB"}/ {Class="MDI*" & Caption="*MENU*"}/ {Child=*}/ {Class="EDIT?.32"}.

The FindMatchingChild function searches each child of the desktop until it finds one of class "WwB", the outermost frame. It then calls itself recursively, passing the handle for the matched child and the trailing-remainder of the rule list to its called self. For each pre-matched child of that window, the recursive call applies the next trailing part of the rule and calls itself again. Any time the calls-to-self recurse deeply enough to satisfy the last criteria in the rules list, the child is stored away in the global or other list of matches.

```
FindMatchingChild(v_window, v_rules)
{
        FOR each child of v_window do
        {
    IF (child satisfies first rule in v_rules) then do
            {
                IF next rule exists in v_rules then
                FindMatchingChild(child, next rule in v_rules)
                ELSE
            child satisfied all rules, ADD it to global list of
matches
            }
        }
} //End of FindMatchingChild
```

As can be seen, the FindMatchingChild function recursively shrinks the size of the trailing part of the rules until there is none left. At that point it is known that the found child window satisfied all the criteria in the given set of NAV_PATH rules. The match may be appended to the global list at that time. Contents of the global list may be sorted as desired afterwards to determine which match should first be further acted upon.

Figure 6A:
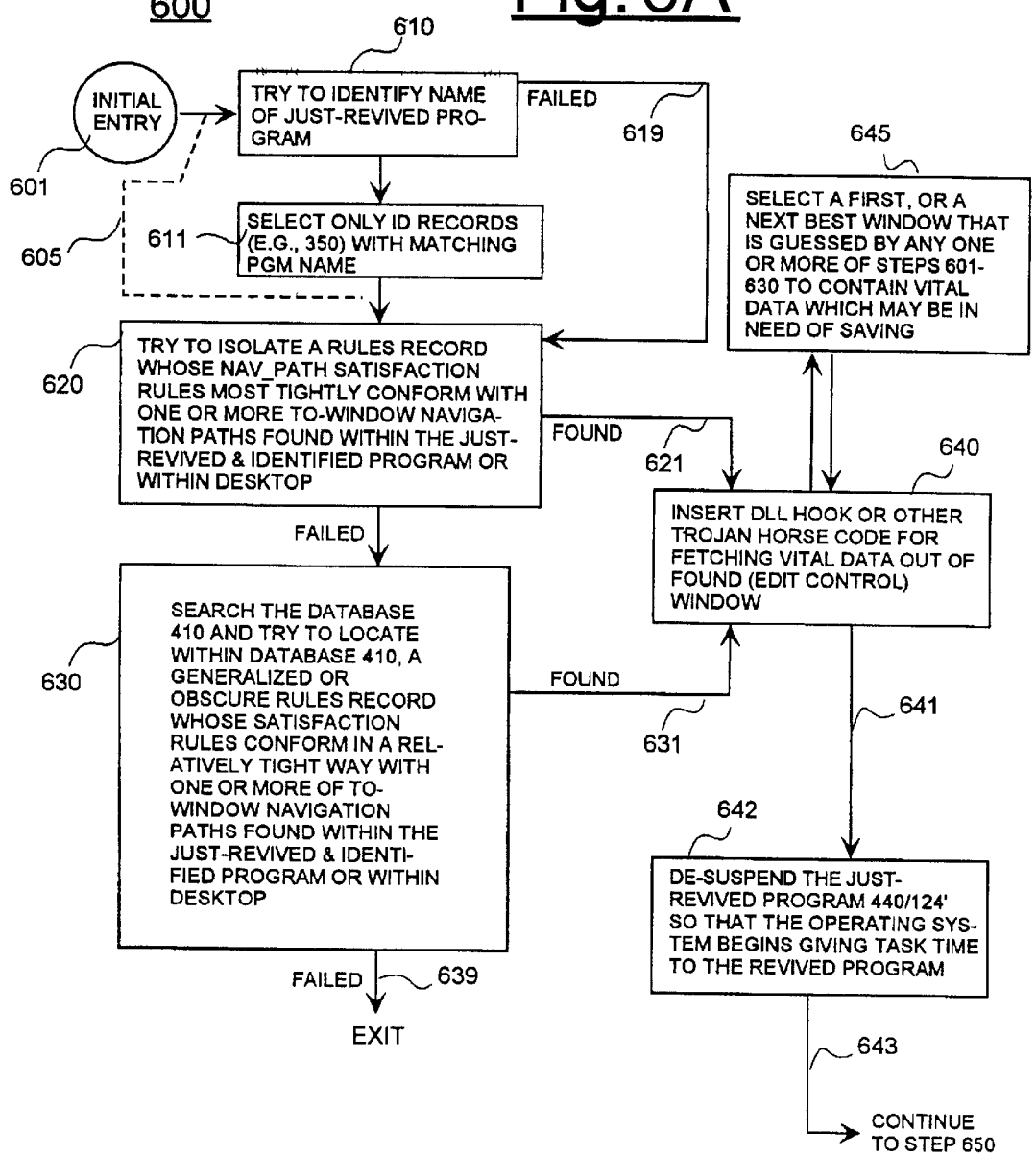
FIGS. 6A–6B combine to define a flow chart showing broader aspects of a vital save operation in accordance with the invention.
Figure 6B:
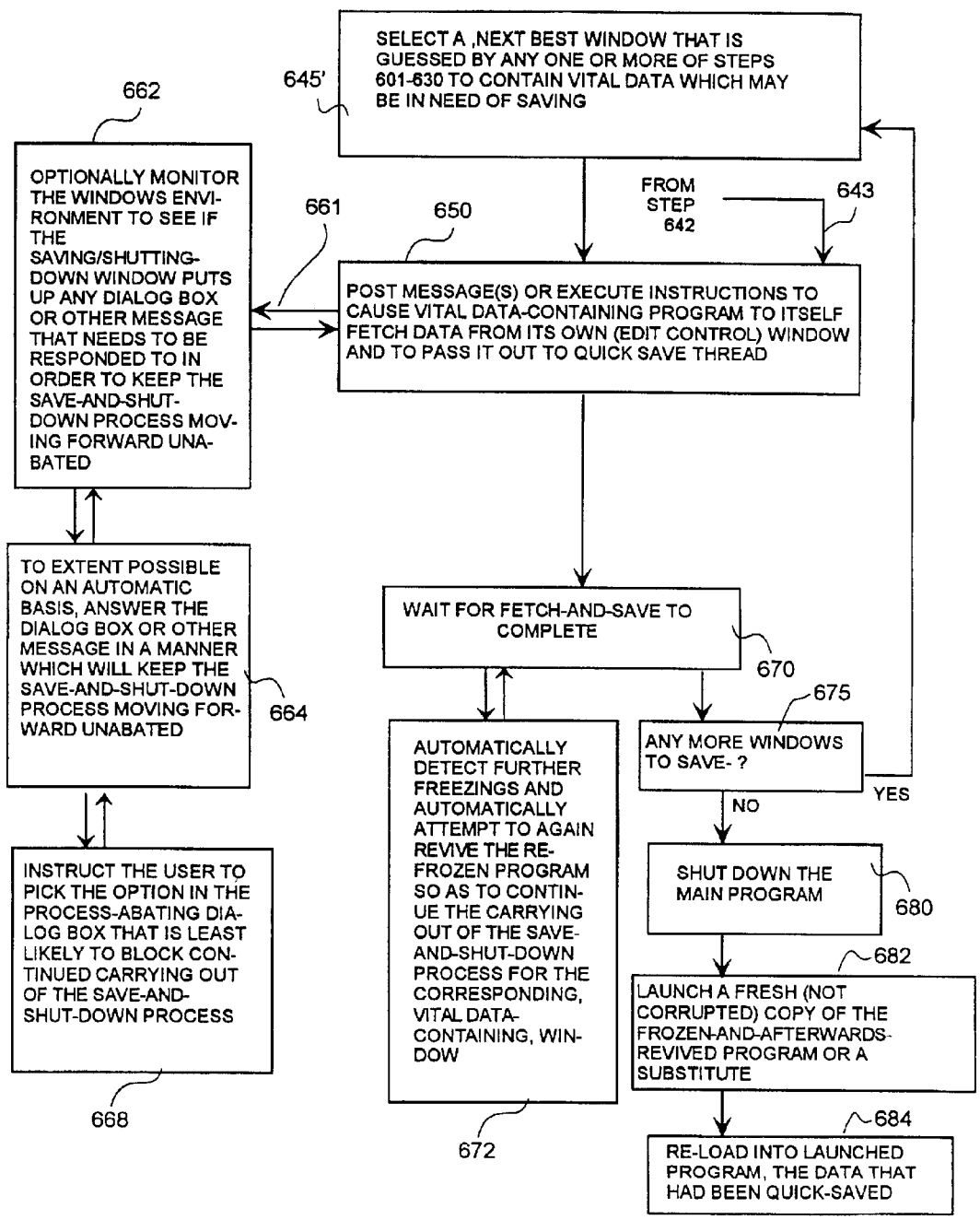

FIGS. 6A–6B combine to define a flow chart 600 depicting broader aspects of a machine-implemented, quick-save operation in accordance with the invention. Entry may be made at step 601. If bypass path 605 is not optionally taken, then at step 610 an attempt is made to identify the name of the just-froze program 440'/124'. In some instances this is a relatively trivial task and in some instances it may not work. Success depends on how well the just-revived program 440'/124' conforms to self-identification protocols and how the crashed, or otherwise frozen thread ties in with the main program. If the identification attempt fails, path 619 passes control to step 620. If the identification attempt succeeds, subsequent step 611 filters out from the database 310/410, those ID records (e.g., 350) whose PGM_NAME criteria are satisfied by the identification found in step 610, and these filtered out records are passed to step 620.

Step 620 may be arrived at from successful completion of filtering step 611, or by way of failure path 619 or by way of bypass path 605. The whole or subset of database 310/410 that is passed to step 620 is searched for rules records whose one or more of the URL-type, DOC-type, {other_TYPE}-type, and PARELL-type, NAV_PATH criteria most tightly conform with navigation paths to windows actually found in the just-froze program 440'/124'. The algorithm of steps 530–570 of FIG. 5, or the above-specified recursive algorithm may be used to locate such tightly conforming windows. If the search or plural searches of step 620 is/are successful, the search results are passed by way of path 621 to step 640.

If the tight search(es) of step 620 is/are not successful, control passes to step 630. Here a more relaxed search is performed for rules records whose NAV_PATH criteria conform with navigation paths to windows actually found in the just-froze program 440'/124'. The algorithm of steps 530–570 of FIG. 5, or the above-specified recursive algorithm may again be used to locate such conforming windows. If the search or plural searches of step 630 is/are successful, the search results are passed by way of path 631 to step 640. If the loosened search(es) of step 630 is/are not successful, control passes by way of path 639 to a process exit point. In this case no windows have been found that conform with even the loosest of navigation path definitions in the database. This is an unlikely event because the database will usually contain a generalized set of catch-all definitions near its tail-end.

At step 640, a detour may be optionally made into step 645 for identifying a best, or next best, one of plural windows of the just-revived, but not yet re-activated program 440'/124'. The detour returns to step 640 with the identification of a window that is most likely or sequentially next likely to contain vital data. Step 640 uses this identification data to plant a Trojan-horse type of code into the not yet re-activated program 440'/124'. After the Trojan-horse type of code is implanted, the modified program is referred to herein by the double-prime designation, 440"/124". That modified program 440"/124" is de-suspended in step 642 so it can receive processor time and thereby execute the Trojan-horse type of code.

Two different types of Trojan-horse implant methods are described here. The first is referenced as a DLL-hook-type method and various embodiments of it 700 are shown in FIGS. 7A and 7B.

Referring to FIG. 7A, at step 710, while program 440' is still suspended, a reviving debugger (hereafter, also the QuickSave or 'QS' debugger) may be trying to bring internal structures of the program 440 into revivable state. During this time (or at a later time of suspension), the QS debugger (710) asks the operating system (OS) to 'hook' (715) an additional subroutine into a message-fetching path 731 of the not yet active program 440('). In one embodiment, the hook is of the Windows GetMessage type. Other hooks can be used though.

After the program 440(')(") is revived (at least partially) and re-activated (de-suspended), a message-processing loop 740 and/or other the message-fetching mechanism 741 (e.g., a GetMessage( ) request sent to the OS by loop 740) will cause the OS to fetch a next message that has been addressed to program 440(')(") from a message queue 732 that normally feeds the message-receiving loop 740 of program 440(')("). The message loop 740 can be an original one of the froze and possibly-revived program 440(')(") or a substitute one that has been provided by a revival process. In general, for the OS-provided hook 715 to work, it requires that the message loop 740 should be 'not busy' at least part of the time so that the message-fetching mechanism 741 (e.g., a GetMessage) asks the OS to fetch the next new message that is addressed to program 440".

The OS-provided hook 715 that is created by steps 640 and 710 may be configured to respond to any arbitrary message such as to "WM_NULL" or uniquely to a special pre-defined message, such as, "QS_GetQuickData". This message or an arbitrary message will be later sent from the QS debugger thread (at step 730) to the modified program 440" after the thread of the modified program 440" is 'desuspended' in subsequent step 642 of FIG. 6A. In response either to the unique message (e.g., "QS_GetQuickData") or to the receipt of any arbitrary message, the OS hook 715 will direct a 'sneak preview' of the message to the DLL subroutine 720 via path 733.

The typical DLL-hook will inspect the message, perhaps modify it, and then let it continue via path 734 to the message processing loop 740 of the program 440. However, our DLL-subroutine 720 is not an ordinary, subroutine for snooping on and/or merely modifying messages. Instead, this DLL-subroutine 720 will have been added into the process space of program 440" by earlier step 710 so as to perform specific operations. Internal details of the DLL-subroutine 720 may be defined in response to window-identification information obtained from database 410'. Hence a connection 464' is shown between the Trojan horse implant step 710 and database 410'.

The implanted DLL-subroutine 720 responds by performing at least two functions, 721 and 722, in the recited order. It may also perform a 'disconnect hook' operation after operation 722, for de-activating hook 715, but such a disconnect is optional.

The first function, 721 is pre-embedded inside subroutine 720 by step 710 so as to pass the following two parameters to a Windows API call known as GetDialogItem( ): the control ID of the child window 129' that actually holds the desired, vital-data (e.g., the URL); and the OS handle of the parent window 119' (typically a control-combo window) that contains the child 129'. A short word about control-combo windows may be in order here. The actual text (e.g., "http://www.uspto.gov/") of the URL or other network address, or of each form-fill-in box, is typically stored in a control-edit window such as the illustrated item 129', where that text is represented as "*****" Users are often given a number of choices for defining the URL or other data, such as manually editing the text in the control-edit window 129' by over typing on part or all of it, or by performing a copy and paste operation (e.g., Ctrl-v). Users can alternatively click on a history pushbutton, such as the one represented by the down-pointing triangle in box 119' to display a list of URL's of previously-visited sites (or to display a list of previous other data). The users can pick one of the listed choices as the site that is to be now visited (or is to be otherwise acted upon). The picked one of the listed choices will the be overwritten into box 129' and the browser will begin to try and acquire data from that newly-defined URL (or will perform other appropriate functions). Because it offers such plural options, box 119' is called control-combo window. Control-edit window 129' is often a child of the control-combo window 119'**.

The two parameters that are passed into the GetDialogItem( ) function of step 721, were provided by step 645 of FIG. 6A before steps 640/710 added the DLL 720. Step 640 modified the DLL 720 accordingly. As already explained, the transfer of this intelligence is represented in FIG. 7A by the coupling 464' between step 710 and database 410'. As indicated by data-transfer line 725, the later-invoked, GetDialogItem( ) function fetches the designated data (inside child 129') and transfers it to a local scratchpad or other memory region that is accessible by DLL 720.

Next, while it is providing a pointer to its scratchpad or other memory region, the DLL 720 sends a "WM_CopyData" message or an equivalent to the QS debugger (now identified in this phase by box 750). In response, the QS debugger 750 retrieves the copy data and saves it. Such saving can be to a temporary, safe region of system memory or to a nonvolatile memory means such as a disk file. In one embodiment, the copy data is appended to or otherwise recorded in a uniquely named disk file with or without inter-data separators such as hard return codes or nulls. Additionally, the relative or absolute location and/or size of the edit-control window from which the copy data came may be recorded in the same or an ancillary file for association with the copy data. An example of a unique name that may be used for such a vital-data-retaining disk file is QUICK_SAVE.TXT, which example will be used below.

The OS does not block the data transfer from element 440(')(") to element 750 because the request for the transfer came from inside the process area of program 440" and hence, the OS assumes that the programmer who wrote program 440" has given permission for the self-fetched data of the program to be transferred from the process area of program 440" to an outside thread, namely the thread of the QS debugger 750. Although the QS debugger 750 can inspect the memory space of program 440(')("), the debugger 750 cannot automatically learn from such inspection where the text of the URL-holding (or other vital-data holding) window 129' is stored. The debugger 750 cannot itself execute a GetDialogItem( ) function that points to data-holding window 129' as the source, because the security-maintaining features of the OS would then intervene and return a null or an error. That is why a convoluted work-around such as that of the DLL-hook was fashioned.

If the QS debugger 750 determines that no further data needs to be retrieved from program 440" and saved, the QS debugger 750 can allow program 440" to be terminated at this point because the QS debugger 750 has gotten and safely saved into its own process space, the desired data (e.g., the URL inside child 129'). Once program 440" is terminated, the OS may deallocate the memory that had been assigned to program 440", and other, concurrently running threads may overwrite that deallocated memory.

FIG. 7B illustrates an alternate embodiment 701 having a slightly different DLL 720' that can often achieve substantially the same result. Instead of the GetDialogItem( ) API function, another Windows API function known as GetWindowText( ) is used as shown at step 721'. Only one, child-identifying parameter has to be passed to GetWindowText, namely the OS handle of the immediate, data-possessing child (129'). Thereafter the remaining steps of the FIG. 7A process (700) can be carried out in the same way.

Figure 7C:
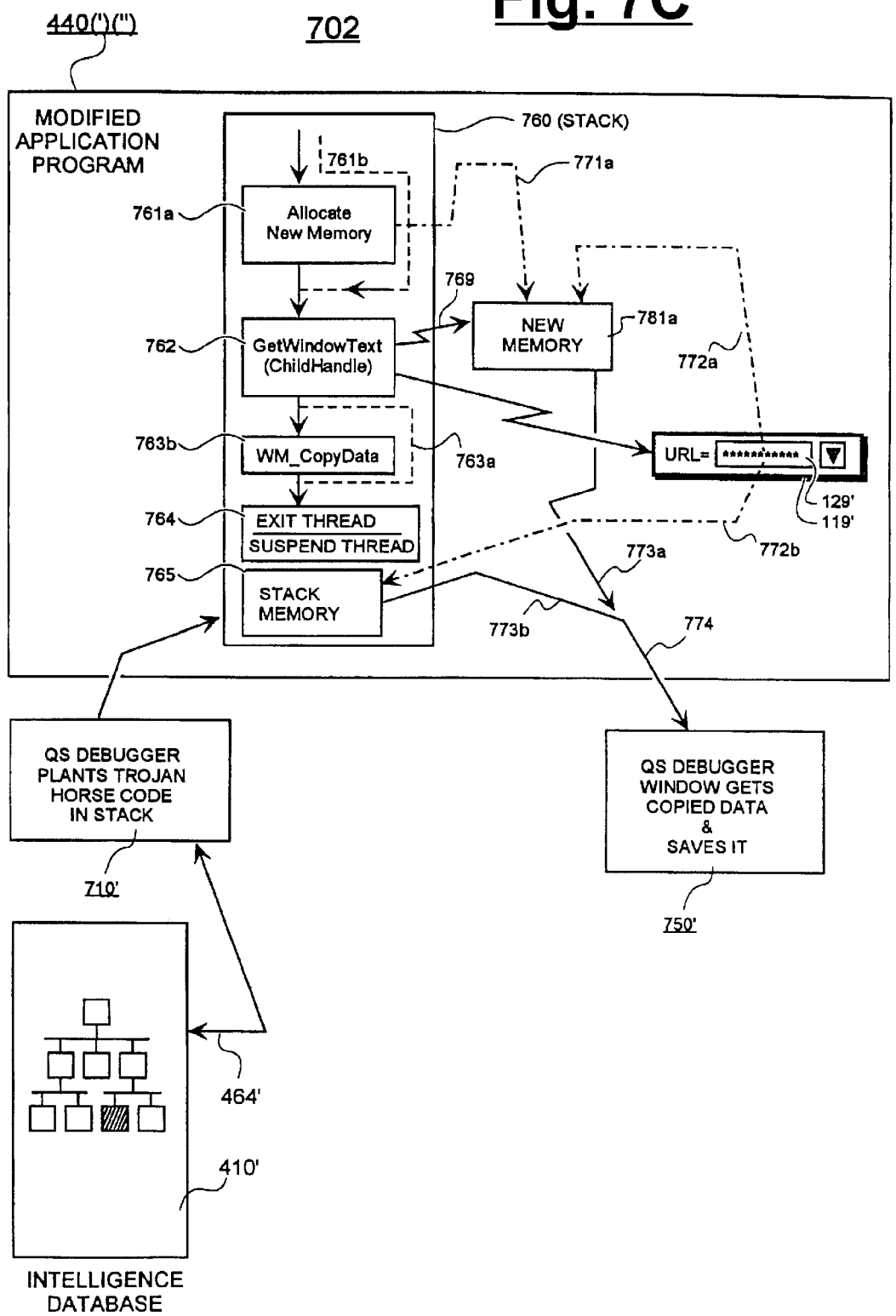

A third Trojan-horse implant method 702 is illustrated in FIG. 7C and is referenced here generally as a code-overwrite method. There are multiple embodiments of the code-overwrite method 702 as will become apparent from the following description of FIG. 7C.

Like reference numbers 710' and 750' are used for operations of the QS debugger that are generally similar to what happened in FIGS. 7A/7B. As such, these do not need to be re-explained in detail. One difference of importance, however, is that in the code-overwrite method 702, there is no requirement for having a not-constantly-busy message loop (see 740 of FIG. 7A). The code-overwrite method 702 can work even if the message loop (740/741) is broken or not present.

It is understood in the carrying out of one version of the code-overwrite method 702 that the thread of program 440' will be terminated (by way of the EXIT THREAD version of step 764) after the vital data (129') is fetched and saved. Therefore it is safe to overwrite code into any desired memory region of the thread of program 440' except over the memory area that holds window 129'. In one embodiment, the overwrite region was chosen to be inside an upper portion 760 of the stack of the thread of program 440' because normally this area is free, and there is a strong probability the vital-data of window 129' is not stored there. However any other region could have been used other than that which stores the vital-data of window 129'. The advantage of using the stack region 760 is that it leaves the op code regions of the crashed or otherwise frozen program 440 unaltered. Debugging techniques and/or revival techniques (e.g., 467) may therefore be used, if desired, for respectively debugging and/or trying to revive the crashed/frozen program 440 after part or all of its vital data has been saved. However, as explained above, if the crashed/frozen program 440 is a conventional Internet browser, there is a better than 50% likelihood that the revival attempts (463, 467) will fail. There is a good likelihood that the better course of action will be to simply terminate the crashed/frozen program 440 after its vital data has been saved, and then to pass the saved vital data to a launched substitute as was indicated for above step 469 of FIG. 4.

In a first embodiment of code-overwrite method 702, memory region 760 (which does not have to be the stack) is filled with the following sequence of instructions: 761a, 762 and 764 (either version of 764). Instruction 761a asks the OS to allocate a new scratchpad memory area 781a for the process (thread) of program 440. The new scratchpad memory area 781a is outside the stack and is at least large enough to hold the URL text of box 129'. A Windows API function such as GetWindowTextLength may be used to determine the amount of space needed. Instruction 762 asks the OS to perform the GetWindowText( ) function, where the passed parameter is the OS handle assigned to child window 129' and a destination pointer 769 is provided pointing to the created scratchpad memory area 781a. As a result the contents of box 129 are copied to the scratchpad memory area 781a, as indicated by dataflow path 772a. Instruction 764 asks the OS to either terminate (EXIT) the thread or to SUSPEND the thread. When the OS terminates the thread (via the EXIT THREAD operation), it may wipe out the contents of the thread's stack (e.g., area 760). This is not a problem however because the vital data is held in scratchpad memory area 781a.

The QS debugger 750' is automatically alerted to the fact that the thread of program 440 has quit or has been suspended because that is the thread that QS debugger 750' is monitoring. In response, the QS debugger 750' reads the contents of scratchpad memory area 781a and saves such contents into its own virtual memory (in the memory space allocated to debugger 750') and/or to an appropriate, vital-data-retaining disk file (e.g., QUICK_SAVE.TXT). The QS debugger 750' knows where the scratchpad memory area 781a is located because the QS debugger planted the Trojan horse code earlier, in step 710, and thus knows exactly how and/or when scratchpad area 781a will be allocated by the OS. The transfer of the URL-data from scratchpad area 781a to debugger 750' is represented by the combination of dataflow paths 773a and 774.

In a second embodiment of code-overwrite method 702, memory region 760 is filled with the following sequence of instructions: 761b, 762, 763b and 764 (either version). Step 761b is simply a bypass of earlier step 761a. Scratchpad memory 781a does not have to be created in this second embodiment because the vital data will instead be stored in stack region 765. Instruction 762 asks the OS to perform the GetWindowText( ) function, where the passed parameter is the OS handle assigned to child window 129' and a destination pointer (not shown) is provided pointing to stack area 765. As a result the contents of box 129 are copied to the stack area 765, as indicated by dataflow path 772b. In new instruction 763b, a "WM_CopyData" message is sent to debugger 750' with a data source pointer directed to stack area 765. In response, the QS debugger 750' receives (from the OS) the contents of stack area 765 (before the thread of program 440" optionally terminates or becomes suspended by operation of step 764). The QS debugger 750' saves such read contents into its own virtual memory (in the memory space allocated to debugger 750'). It may also save the data to a disk file if desired. The transfer of the URL-data from stack area 765 to debugger 750l is represented by the combination of dataflow paths 773*b* and 774. The thread EXIT/SUSPEND step, 764 is optional and may be included if it is desired to immediately terminate or suspend the thread of program 440" and activate the debugger 750' for further processing. Alternatively, steps 762 and 763*b* may be repeated wherein a new child handle is passed to the GetWindowText( ) function of repeated step 762.

It should now be apparent that another variation is to fill memory region 760 with the following sequence of instructions: 761*a*, 762, 763*b* and 764 (either version). Here, new memory area 781*a* would be created, and respective steps 762 and 763*b* would respectively reference new memory area 781*a* as destination and source. Also of course, the GetWindowText( ) function of step 762 could be replaced with a GetDialogItem( ) function such as was used in step 721 of FIG. 7A.

Returning to FIG. 6A, it is seen that steps 640 and 642 thereof correspond generally to steps 710 of FIGS. 7A–7C. Step 642 'desuspends' the thread of the modified program 440" so that the multitasking OS now begins to give processor time to the desuspended program. At the same time that the hooked or otherwise modified program 440" is desuspended, control passes by way of path 643 to step 650 (FIG. 6B). Step 650 corresponds generally to step 750 of FIGS. 7A–7C. Depending on context, either the hook-invoking message (730) is posted to the desuspended and modified program 440" or the context (e.g., EIP instruction pointer) of modified program 440" is set to begin execution of implanted code 760. either of these approaches cause the modified, and vital-data containing program 440" to itself fetch the data from its own vital-data containing window (e.g., edit-control window 129') and to export that data to the quick-save thread.

Bidirectional coupling 661 represents a first, optional monitoring and automatic interceding action that can be carried out while the Post-and-Save operations of step 650 proceed forward. In some instances, the self-saving program 440" may try to put up a safety dialog box that prods the user with a question like. "Are you sure you want to perform function X now? Enter for Yes. Hit Escape for Cancel." The safety dialog may then block the automatic actuation of the message-based DLL-hook 720 for the embodiments of FIGS. 7A–7B. (The code overwrite technique of FIG. 7C should not have this problem.) Continuance of the Post-and-Save process may be blocked until the user responds appropriately. Step 662 repeatedly looks for such safety dialogs, and if not seen lets step 650 continue. If step 662 detects a safety dialog, control is passed to step 664. To the extent possible on an automatic basis, step 664 sends an appropriate message to the safety dialog window for closing that safety dialog window and letting the Post-and-Save process (650) continue unabated. In one embodiment, the safety window closing message is specified by an additional field (not shown) of corresponding ID record 350. If step 664 cannot automatically determine what the appropriate message is, control is passed to step 668 where is the user is given appropriate suggestions for helping the user to decide what the best response is to the safety dialog window so that the Post-and-Save process (650) can continue unabated.

While a vital data-containing window is undergoing the Post-and-Save process (650), the quick-save process 600 waits at step 670 for a completion indication. During this time, a second, optional monitoring and automatic interceding action can be carried out to help the Post-and/or-Save operations of step 650 proceed forward. The modified, and therefore self-saving, program 440" may encounter further crashes or other freezes during the time of the Post-and/or-Save operations of step 650. Optional step 672 automatically monitors the environment for such further freezes and automatically attempts to again revive the re-frozen program so that the Post-and/or-Save operations of step 650 can continue unabated.

One set of methods for automatically reviving a fatally crashed thread is disclosed in the above-cited U.S. Ser. No. 08/938,204 (COMPUTER METHOD AND APPARATUS FOR UNFREEZING AN APPARENTLY FROZEN APPLICATION PROGRAM BEING EXECUTED UNDER CONTROL OF AN OPERATING SYSTEM) and its explanation will thus not be repeated in detail here. Briefly, one of such methods provides a trace from the current top of the thread's stack towards its base, where the trace looks for a special signature (the CallWndPro process return signature).

After step 670 detects completion of the one or more, Post-and/or-Save operations of step 650, control may be transferred to step 675 for automatically determining if there are any more windows in the application program 440" that need to have their contents saved. If the answer is YES, control loops back to step 645' for repetition of the Post-and/or-Save operations 650 on a next, one or more vital data-containing windows.

If the answer to test step 675 is instead NO, control is passed forward to shut-down step 680. Here, an attempt is made to terminate the main program after the contents of all of its vital data-containing windows have been saved. In one embodiment, process step 680 waits for the main program status to switch to idle by, for example, using the WaitForInputIdle function of Windows95/98™. It records the name of the main program, and after the idle state is detected, it tries to shut down the main program by issuing to the main outer window (e.g., 114/214) of that program (440"/124") one or more command messages such as (in preferred order): WM_CLOSE and WM_QUIT. Even if the WM_CLOSE message does not work, the WM_QUIT message should at least force the program to quit its main message loop. Thereafter, if neither of these steps causes the program (440"/124") to shut down cleanly, step 680 uses the TerminateProcess function of the OS to more forcibly terminate the frozen-and-afterwards-modified and desuspended program (440"/124").

At next step 682, process 600 either automatically or after permission is manually granted by the user, launches a fresh (not corrupted) copy of the frozen program (440/124). Alternatively, step 682 can launch a substitute program. For example, if the browser program that just froze was Netscape Navigator™, step 682 might launch a version of Microsoft's Internet Explorer™ as a substitute. At next step 684, the data that had been saved by step 650 is passed into the newly loaded program. The user can then be made to perceive that his or her lost work product had been saved and the crashed main program as been brought back to full health.

Steps 682 and 684 may be carried out in several different ways. Each has advantages and disadvantages. In one of the ways, the URL data obtained and saved by steps 650/750(') is passed as a simple parameter to the RUN( ) function of the OS. The instruction to the OS may then appear as follows: "RUN http://www.longstring.com". Modern OS's such as Microsoft Windows95/98™ have the intelligence to figure out this intended for a web browser. They will typically launch the default web browser and pass the URL to it. Of course, the system's default web browser may not be the same as the browser that just crashed. That may be a good thing in a strange way because the browser that just crashed may have done so due to a Java-script or other incompatibility. The system's default web browser may be able to overcome this problem and thereby successfully acquire the web page information that the earlier browser could not.

A second way to carry out the operations of steps 682 and 684 is to insert both a browser name and the URL into the RUN command. The instruction to the OS may then appear as follows: "RUN PGM_NAME http://www.longstring.com", where PGM_NAME is a program name that was matched by a corresponding search through database 310/410.

A third way is to launch the program name that was matched by a corresponding search through database 310/410 and to thereafter pass appropriate messages to the program for filling-in saved vital-data into respective windows of the launched program.

A fourth way is to launch the program name that was matched by a corresponding search through database 310/410 and to simultaneously pass the name of the data-save file (e.g., QUICK_SAVE.TXT) to the OS for 'opening'. The OS will select an appropriate viewing or editing program for opening that file and showing its contents to the user. The user may then be next encouraged by automatically displayed instructions or otherwise to copy and paste (or cut and paste) appropriate parts of the opened file into corresponding parts of the freshly launched substitute for the recently-froze application program (1241/4401).

A fifth alternative is to simply pass the name of the data-save file (e.g., QUICK_SAVE.TXT) to the OS for 'opening'. The OS will usually select an appropriate viewing or editing program for opening that file and showing its contents to the user. If it is of an unregistered type, the user will usually be asked to identify a file-opening program. After the file is opened, the user may be next encouraged by automatically displayed instructions or otherwise to use the data in the opened file (e.g., QUICK_SAVE.TXT) as the user pleases.

The above described, machine-implemented or otherwise carried out processes for automatically locating data-containing windows in a frozen application program and for saving work product contents may be provided by appropriate software. Such software can be introduced into system 100 of FIG. 2A by way of computer-readable media (175) or as a electromagnetic, instructing signals (190). It has been explained above that system I/O module 180 may use system bus 155 for transferring data between one or more of the illustrated portions of system 100 and external devices. In one embodiment, the system I/O module 180 may couple the illustrated system 100 to a local area network (LAN) or to a wide area network (WAN) or to other external data transceiving and processing means and electromagnetic, instructing signals for causing system 100 to perform in accordance with the above described procedures may come in by any one or more of such external data transceiving and processing means. Additionally and/or alternatively, the disk subsystem 170 which typically includes a drive (not separately shown) and a nonvolatile data storage medium (e.g., 175) may be used for storing databases such as above-described databases 310/410 and may be used for conveying part or all of the software instructing signals. The data storage medium 175 may be in the form of a magnetic hard disk, or a floppy diskette, or a re-writeable optical disk, or other such non-volatile, randomly accessible, re-writeable media. ROM or Flash EEPROM may be alternatively used in carrying out some or all of the nonvolatile data storing functions of the disk subsystem. It is understood that the data that is recorded on the disk subsystem may be brought into subsystem or into system memory through a variety of data conveying means including but not limited to: floppy diskettes, compact-disks (CD ROM), tape, and over-a-network downloading by a file server computer or the like.

Given the above disclosure of general concepts and specific embodiments, the scope of protection sought is to be defined by the claims appended hereto.

What is claimed is:

1. A machine system for automatically saving work product of frozen application programs, said machine system comprising:
    (a) first means for identifying one or more windows of an application program that has recently froze, where such one or more windows most probably contain vital data worthy of saving; and
    (b) second means, operatively coupled to and responsive to the first means, for instructing the application program to transfer the data of said one or more of said identified windows to a separate, data-saving thread.

2. The machine system of claim 1 wherein said first means includes:
    (a.1) a database having a plurality of criteria satisfaction records, where each said criteria satisfaction record defines at least one of:
        (a.1a) a parent/child hierarchy relationship between a vital data-containing window and other windows of a respective one or more application programs, and
        (a.1b) a child to name of containing program relationship between a vital data-containing window and a respective one or more application programs.

3. The machine system of claim 2 wherein each said criteria satisfaction record defines at least both of said parent/child hierarchy relationship and said child to name of containing program relationship.

4. The machine system of claim 2 wherein:
    (a.2) each said criteria satisfaction record is further associated with a data transfer message field that identifies a respective transfer request message stream that is to be sent to a corresponding data-saving thread for causing such a thread to receive and save the sent data.

5. A machine-implemented method for automatically saving work product of application programs that have recently froze, said machine-implemented method comprising the steps of:
    (a) identifying one or more windows of an application program that has recently froze, where such one or more identified windows most probably contain vital data worthy of saving; and
    (b) instructing the application program to transfer the data of said one or more of said identified windows to a separate, data-saving thread.

6. An instruction conveying device for conveying machine instructions to a programmable machine, where the conveyed instructions cause said machine to save work product of frozen application programs by carrying out a saving method comprising the steps of:
    (a) identifying one or more windows of a frozen application program which most probably contain vital data in need of saving; and
    (b) instructing the frozen application program to transfer the data of said one or more of said identified windows to a separate, data-saving thread.

7. An instructing signal for instructing a programmable machine to save work product of frozen application programs, said instructing signal causing the machine to carry out a saving method comprising the steps of:
  (a) identifying one or more windows of a frozen and subsequently revived application program which most probably contain vital data in need of saving; and
  (b) instructing the frozen application program to transfer the data of said one or more of said identified windows to a separate, data-saving thread.

8. The instructing signal of claim 7 wherein said instructing signal further causes the machine to carry out the step of:
  (c) causing the data-saving thread to save the transferred data into a nonvolatile memory means.

9. The instructing signal of claim 8 wherein said saving of the transferred data into a nonvolatile memory means includes appending the transferred data to a predefined nonvolatile file.

* * * * *